United States Patent
Park et al.

(10) Patent No.: US 10,135,284 B2
(45) Date of Patent: Nov. 20, 2018

(54) WIRELESS CHARGING EQUIPMENT FOR PROVIDING CHARGING SERVICE TO SELECTIVE USERS

(71) Applicant: SK Planet Co., Ltd., Gyeonggi-do (KR)

(72) Inventors: Yon Won Park, Gyeonggi-do (KR); Hyun Wook Kim, Gyeonggi-do (KR); Joon Sok Im, Seoul (KR); Seong Wook Kang, Gyeonggi-do (KR); Seung Won Na, Seoul (KR); Kyeong Ho Seo, Gyeonggi-do (KR); Hyung Min Jin, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 325 days.

(21) Appl. No.: 14/892,160

(22) PCT Filed: Dec. 1, 2014

(86) PCT No.: PCT/KR2014/011637
§ 371 (c)(1),
(2) Date: Nov. 18, 2015

(87) PCT Pub. No.: WO2015/156477
PCT Pub. Date: Oct. 15, 2015

(65) Prior Publication Data
US 2016/0094083 A1 Mar. 31, 2016

(30) Foreign Application Priority Data

Apr. 11, 2014 (KR) .................. 10-2014-0043452
Jun. 12, 2014 (KR) .................. 10-2014-0071232
Jun. 23, 2014 (KR) .................. 10-2014-0076773

(51) Int. Cl.
*H02J 7/02* (2016.01)
*H02J 50/40* (2016.01)
(Continued)

(52) U.S. Cl.
CPC .............. *H02J 7/025* (2013.01); *H02J 7/042* (2013.01); *H02J 50/12* (2016.02); *H02J 50/20* (2016.02);
(Continued)

(58) Field of Classification Search
CPC .......... H02J 7/025; H02J 7/042; H02J 7/0004; H02J 7/0027; H02J 50/12; H02J 50/40;
(Continued)

(56) References Cited

U.S. PATENT DOCUMENTS 8,824,346 B2 9/2014 Woo et al.
2010/0041333 A1* 2/2010 Ungari ..................... H02J 7/00
455/41.2
(Continued)

FOREIGN PATENT DOCUMENTS

CN 102882241 A 1/2013
JP 2011-152008 A 8/2011
(Continued)

OTHER PUBLICATIONS

English Translation of Office Action, State Intellectual Property Office of the People's Republic of China Patent Application No. 201480026209.3, Aug. 3, 2018.*
(Continued)

*Primary Examiner* — Richard Isla Rodas
*Assistant Examiner* — Manuel Hernandez
(74) *Attorney, Agent, or Firm* — Fenwick & West LLP

(57) ABSTRACT

Provided are wireless charging equipment, a terminal, a wireless charging system comprising the same, a control method thereof, and a non-transitory computer readable
(Continued)

storage medium having computer program recorded thereon. That is, the present invention performs a charging function based on a charging signal in the corresponding terminal by transmitting the charging signal to only the terminal corresponding to a communication provider or an affiliated company pre-registered in the wireless charging equipment to provide a charging function to only the pre-registered terminal with respect to a terminal to use a wireless charging infrastructure, easily and conveniently perform an authentication function for the terminal without a separate additional component, and improve operation efficiency of the entire wireless charging system.

10 Claims, 8 Drawing Sheets

(51) Int. Cl.
*H02J 50/12* (2016.01)
*H02J 7/04* (2006.01)
*H02J 50/20* (2016.01)
*H02J 50/80* (2016.01)
*H04L 12/10* (2006.01)
*H02J 7/00* (2006.01)
*H04W 4/60* (2018.01)

(52) U.S. Cl.
CPC .............. *H02J 50/40* (2016.02); *H02J 50/80* (2016.02); *H04L 12/10* (2013.01); *H02J 7/0004* (2013.01); *H02J 7/0027* (2013.01); *H02J 2007/0001* (2013.01); *H02J 2007/0096* (2013.01); *H04W 4/60* (2018.02)

(58) Field of Classification Search
CPC .... H02J 50/80; H02J 50/20; H02J 2007/0096; H02J 2007/0001; H04L 12/10; H04W 4/003
USPC .......................................... 320/108; 307/104
See application file for complete search history.

(56) References Cited

U.S. PATENT DOCUMENTS

| | | | |
|---|---|---|---|
| 2011/0119144 A1 | 5/2011 | Grilli et al. | |
| 2012/0213134 A1 | 8/2012 | Woo et al. | |
| 2012/0268238 A1* | 10/2012 | Park | G07F 15/006 340/5.8 |
| 2013/0288750 A1* | 10/2013 | Itoh | H04L 12/2856 455/558 |
| 2015/0031334 A1* | 1/2015 | Wu | H02J 5/005 455/411 |
| 2015/0137748 A1* | 5/2015 | Kim | H02J 17/00 320/108 |
| 2015/0214775 A1* | 7/2015 | Lee | H02J 7/025 320/137 |
| 2015/0244201 A1* | 8/2015 | Chu | H02J 7/025 320/108 |
| 2015/0318729 A1* | 11/2015 | Leabman | H02J 7/025 307/104 |

FOREIGN PATENT DOCUMENTS

| | | |
|---|---|---|
| KR | 10-2012-0120692 A | 11/2012 |
| KR | 10-2013-0028011 A | 3/2013 |
| KR | 10-2013-0082952 A | 7/2013 |

OTHER PUBLICATIONS

International Search Report in PCT International Application No. PCT/KR2014/011637, dated Mar. 5, 2015.
Office Action, State Intellectual Property Office of the People's Republic of China Patent Application No. 201480026209.3, Aug. 3, 2018, 13 pages (with concise explanation of relevance).

* cited by examiner

WIRELESS CHARGING EQUIPMENT FOR PROVIDING CHARGING SERVICE TO SELECTIVE USERS

CROSS-REFERENCE TO RELATED APPLICATION

This application is the U.S. national phase of PCT Application No. PCT/KR2014/011637 filed on Dec. 1, 2014, which claims the benefit of Korean Application Nos. 10-2014-0043452 filed on Apr. 11, 2014, 10-2014-0071232 filed on Jun. 12, 2014 and 10-2014-0076773 filed on Jun. 23, 2014 with the Korean Intellectual Property Office, the disclosures of which are incorporated herein by reference.

BACKGROUND OF THE INVENTION

1. Field of the Invention

The present invention relates to wireless charging equipment, a terminal, a wireless charging system comprising the same, a control method thereof, and a non-transitory computer readable storage medium having computer program recorded thereon, and more particularly, to wireless charging equipment, a terminal, a wireless charging system comprising the same, a control method thereof, and a non-transitory computer readable storage medium having computer program recorded thereon capable of performing a charging function based on a charging signal in a corresponding terminal by transmitting the charging signal to only the terminal corresponding to a communication provider or an affiliated company which is pre-registered in the wireless charging equipment.

2. Description of the Related Art

Wireless charging equipment (alternatively, a wireless power transmitting device) is a power transferring device which wirelessly transfers power required for an electronic device.

The wireless charging equipment communicates with a terminal adjacent to the corresponding wireless charging equipment, and the corresponding wireless charging equipment transmits a charging signal to the corresponding terminal, the terminal charges a battery provided in the corresponding terminal based on the charging signal, and thus, there is an inefficient aspect in that the charging signal is not provided to a pre-authorized terminal.

SUMMARY OF THE INVENTION

An object of the present invention is to provide wireless charging equipment, a terminal, a wireless charging system comprising the same, a control method thereof, and a non-transitory computer readable storage medium having computer program recorded thereon for transmitting a charging signal to a terminal corresponding to a communication provider or an affiliated company which is pre-registered in the wireless charging equipment in alliance for wireless power (A4WP) type wireless charging.

Another object of the present invention is to provide wireless charging equipment, a terminal, a wireless charging system comprising the same, a control method thereof, and a non-transitory computer readable storage medium having computer program recorded thereon for determining whether a terminal is a terminal corresponding to a communication provider or an affiliated company which is pre-registered in the wireless charging equipment based on a PRU static parameter and a PRU dynamic parameter including at least one of an IMSI and an IMEI of the terminal which is transmitted from the terminal to the wireless charging equipment, after connecting the terminals including the wireless charging equipment and the PRU.

Yet another object of the present invention is to provide wireless charging equipment, a terminal, a wireless charging system comprising the same, a control method thereof, and a non-transitory computer readable storage medium having computer program recorded thereon for verifying whether to agree to provide personal information to the terminal from the wireless charging equipment as an internet access cost and providing access information for an AP in a store when agreeing with providing the personal information to the terminal, when the terminal attempts to be charged through the wireless charging equipment.

Still another object of the present invention is to provide wireless charging equipment, a terminal, a wireless charging system comprising the same, a control method thereof, and a non-transitory computer readable storage medium having computer program recorded thereon for collecting internet usage information of the terminal transferred through an AP, when the terminal accesses the corresponding AP based on access information for the AP in the store provided to the terminal during charging.

Still another object of the present invention is to provide wireless charging equipment, a terminal, a wireless charging system comprising the same, a control method thereof, and a non-transitory computer readable storage medium having computer program recorded thereon for determining whether the corresponding terminal is charged based on whether a terminal during charging exists through the corresponding wireless charging equipment and whether a user of the corresponding terminal is a pre-registered user in the wireless charging equipment.

Still another object of the present invention is to provide wireless charging equipment, a terminal, a wireless charging system comprising the same, a control method thereof, and a non-transitory computer readable storage medium having computer program recorded thereon for providing additional services to a corresponding terminal based on charging start time information and wireless charging equipment access time information of a terminal which performs a charging function through the corresponding wireless charging equipment transmitted from the wireless charging equipment in a service providing device.

According to an aspect of the present invention, wireless charging equipment includes: a communication unit configured to communicate based on a Bluetooth low energy (BLE) scheme and receive a PRU static parameter or a PRU dynamic parameter added with at least one of an international mobile subscriber identity (IMSI), an international mobile equipment identity (IMEI), affiliated company information which are transmitted from a connected terminal; and a control unit configured to control the communication unit so as to transmit a charging signal generated at a predetermined time interval to the terminal, when at least one of the IMSI, the IMEI, and the affiliated company information included in the received PRU static parameter or PRU dynamic parameter corresponds to pre-registered communication provider information or pre-registered affiliated company information.

Preferably, the IMSI may include a mobile country code, a mobile network code, a mobile subscriber identity, and a country mobile subscriber identifier number, and the IMEI may include a unique serial number of the terminal, a manufacturer of the terminal, and model information.

Preferably, the affiliated company information may include information on an affiliated company subscribed by a user of the terminal.

Preferably, the control unit may determine whether the terminal is a pre-registered communication provider or affiliated company capable of receiving the charging signal based on at least one of the IMSI, the IMEI, and the affiliated company information included in the received PRU static parameter or PRU dynamic parameter.

Preferably, the control unit may perform a predetermined latch fault process when at least one of the IMSI, the IMEI, and the affiliated company information included in the received PRU static parameter or PRU dynamic parameter does not correspond to pre-registered communication provider information or pre-registered affiliated company information.

According to another aspect of the present invention, a terminal includes: a communication unit configured to communicate based on a BLE scheme and receive a power beacon signal transmitted from wireless charging equipment; and a control unit configured to control the communication unit so as to verify an IMSI, an IMEI, and affiliated company information of the terminal including the communication unit, add at least one of the verified IMSI, the IMEI, and the affiliated company information to at least one of a PRU static parameter and a PRU dynamic parameter, and transmit the PRU static parameter or the PRU dynamic parameter added with at least one of the IMSI, the IMEI, and the affiliated company information to the wireless charging equipment.

Preferably, the control unit may control the communication unit so as to transmit a PRU advertisement signal to the wireless charging equipment in response to the power beacon signal transmitted from the wireless charging equipment and communicate with the wireless charging equipment based on the transmitted PRU advertisement signal.

Preferably, the control unit may divide the verified IMSI or IMEI when the field number of verified IMSI or IMEI is larger than the field number usable in the PRU static parameter and the PRU dynamic parameter and distribute and add the divided IMSI or IMEI to the PRU static parameter and the PRU dynamic parameter, respectively.

Preferably, the control unit may add at least one of the verified IMSI, IMEI, and affiliated company information to an RFU field in the PRU static parameter or an RFU field in the PRU dynamic parameter.

Preferably, the control unit may control the battery included in the terminal to be charged based on the charging signal transmitted from the wireless charging equipment, after determining that the terminal is the communication provider or affiliated company pre-registered in the wireless charging equipment based on the transmitted PRU static parameter or PRU dynamic parameter.

According to yet another aspect of the present invention, a control method of wireless charging equipment includes: receiving a PRU static parameter or a PRU dynamic parameter added with at least one of an IMSI, an IMEI, and affiliated company information transmitted from a terminal communicating based on a BLE scheme by means of a communication unit; determining whether the terminal is a pre-registered communication provider or affiliated company capable of receiving the charging signal based on at least one of the IMSI, the IMEI, and the affiliated company information included in the received PRU static parameter or PRU dynamic parameter by means of a control unit; and as the determined result, controlling the communication unit to transmit to the terminal a charging signal generated at a predetermined time interval by means of the control unit when the terminal corresponds to the pre-registered communication provider or affiliated company capable of receiving the charging signal.

According to still another aspect of the present invention, a control method of a terminal includes: communicating with wireless charging equipment based on a BLE scheme by means of a communication unit; verifying an IMSI, an IMEI, and affiliated company information of the terminal including the communication unit by means of a control unit; inserting at least one of the verified IMSI, IMEI, and affiliated company information to at least one parameter of a PRU static parameter and a PRU dynamic parameter by means of the control unit; and transmitting the PRU static parameter or the PRU dynamic parameter inserted with at least one of the IMSI, the IMEI, and the affiliated company information by means of the communication unit.

Preferably, the communicating with the wireless charging equipment may include: receiving a power beacon signal transmitted from the wireless charging equipment by means of the communication unit; controlling the communication unit to transmit a PRU advertisement signal to be transmitted to the wireless charging equipment in response to the received power beacon signal by means of the control unit; and communicating with the wireless charging equipment based on the transmitted PRU advertisement signal by means of the control unit.

Preferably, the inserting of at least one of the verified IMSI, IMEI, and affiliated company information to at least one of the PRU static parameter and the PRU dynamic parameter may include: dividing the verified IMSI or IMEI when the field number of verified IMSI or IMEI is larger than the field number usable in the PRU static parameter and the PRU dynamic parameter; and distributing and adding the divided IMSI or IMEI to an RFU field in the PRU static parameter and an RFU field in the PRU dynamic parameter, respectively.

According to still another aspect of the present invention, a computer program executing the methods according to the aforementioned embodiments may be stored in a non-transitory computer readable storage medium having a computer program recorded thereon.

According to still another aspect of the present invention, a wireless charging system include: a terminal configured to provide a PRU static parameter and a PRU dynamic parameter added with at least one of an IMSI, an IMEI, and affiliated company information; and wireless charging equipment configured to transmit a charging signal generated at a predetermined time interval to the terminal, when at least one of the IMSI, the IMEI, and the affiliated company information included in the PRU static parameter or PRU dynamic parameter provided from the terminal corresponds to pre-registered communication provider information or pre-registered affiliated company information.

According to still another aspect of the present invention, wireless charging equipment includes: a communication unit configured to communicate with a terminal based on a BLE scheme; and a control unit configured control the communication unit to generate a personal information provision inquiry signal when a battery included in terminal is charging by communicating with the terminal or transmitting a charging signal to the terminal and transmit the generated personal information provision inquiry signal to the terminal and control the communication unit to provide access information on an access point installed in a store where the wireless charging equipment including the communication unit is provided to the terminal based on a response signal transmitted from the terminal in response to the transmitted personal information provision inquiry signal.

According to still another aspect of the present invention, wireless charging equipment includes: a communication unit configured to communicate with a terminal based on a BLE scheme, receive a PRU advertisement signal transmitted from the terminal, and communicate with a service providing device based on an HTTP scheme; and a control unit configured to control the communication unit to transmit a PRU recognition request signal including the PRU advertisement signal to the service providing device, perform an authentication process for the terminal while charging based on a PRU recognition response signal transmitted from the service providing device, in response to the transmitted PRU recognition request signal, and determine whether the terminal is charged based on the authentication result.

As described above, according to the present invention, it is possible to provide a charging function to only a pre-registered terminal with respect to terminals to use a wireless charging infrastructure by transmitting a charging signal to the terminal corresponding to a communication provider or an affiliated company which are pre-registered in the wireless charging equipment in A4WP type wireless charging.

Further, it is possible to easily and conveniently perform an authentication function for the terminal without a separate additional component and improve operation efficiency of the entire wireless charging system by determining whether a terminal is a terminal corresponding to a communication provider or an affiliated company which is pre-registered in the wireless charging equipment based on a PRU static parameter and a PRU dynamic parameter including at least one of an IMSI and an IMEI of the terminal which is transmitted from the terminal to the wireless charging equipment, after connecting the terminals including the wireless charging equipment and the PRU.

Further, it is possible to enlarge an application range of the wireless charging system by verifying whether to agree to provide personal information to the terminal from the wireless charging equipment as an internet access cost and providing access information for an AP in a store when agreeing with providing the personal information to the terminal, when the terminal attempts to be charged through the wireless charging equipment.

Further, it is possible to be utilized as marketing information or a separate recommending service based on collected internet usage information of the terminal by collecting the internet usage information of the terminal transferred through an AP, when the terminal accesses the corresponding AP based on access information for the AP in the store provided to the terminal during charging.

Further, it is possible to improve system efficiency of the entire wireless charging system by determining whether the corresponding terminal is charged based on whether a terminal during charging exists through the corresponding wireless charging equipment and whether a user of the corresponding terminal is a pre-registered user in the wireless charging equipment.

Further, it is possible to enlarge an application range of the wireless charging system and improved convenience for use by providing additional services to a corresponding terminal based on charging start time information and wireless charging equipment access time information of a terminal which performs a charging function through the corresponding wireless charging equipment transmitted from the wireless charging equipment in a service providing device.

DETAILED DESCRIPTION OF THE PREFERRED EMBODIMENTS

Figure 1:
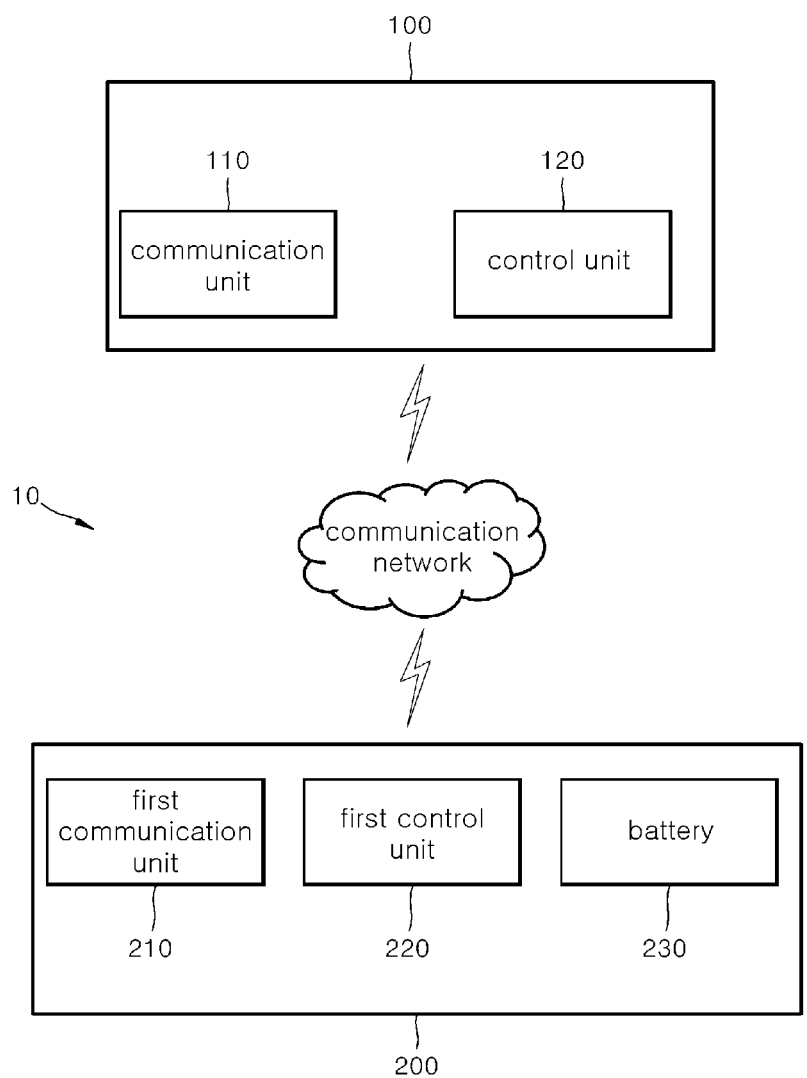
FIG. 1 is a block diagram illustrating a configuration of a wireless charging system according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a wireless charging system 10 according to an embodiment of the present invention.

As illustrated in FIG. 1, the wireless charging system 10 is constituted by wireless charging equipment 100 and a terminal 200. All the constituent elements of the wireless charging system 10 illustrated in FIG. 1 are not required constituent elements, and the wireless charging system 10 may be implemented by more constituent elements than the constituent elements illustrated in FIG. 1 or less constituent elements therethan. Here, the wireless charging equipment 100 and the terminal 200 charge a battery provided in the corresponding terminal 200 based on a charging signal transmitted from the wireless charging equipment 100 through alliance for wireless power (A4WP) scheme (alternatively, a magnetic resonance scheme). Further, the wireless charging equipment 100 and the terminal 200 use BLE for low power in Bluetooth.

The terminal 200 transmits a PRU static parameter and a PRU dynamic parameter to which at least one of an IMSI, an IMEI, and affiliated company information of the terminal 200 is added to the wireless charging equipment 100. Thereafter, the wireless charging equipment 100 determines whether the corresponding terminal 200 is a pre-registered communication provider or affiliated company capable of receiving a charging signal based on at least one of the IMSI, the IMEI, and the affiliated company information included in the PRU static parameter and the PRU dynamic parameter. Thereafter, the wireless charging equipment 100 transmits the charging signal to the corresponding terminal 200 based on the determined result. Further, only when the terminal 200 receives the charging signal from the corresponding wireless charging equipment 100, the battery included in the corresponding terminal 200 is charged based on the charging signal transmitted from the corresponding wireless charging equipment 100.

As illustrated in FIG. 1, the wireless charging equipment 100 (alternatively, a power transmitting unit PTU) is constituted by a communication unit 110 and a control unit 120. All the constituent elements of the wireless charging equipment 100 illustrated in FIG. 1 are not required constituent elements, and the wireless charging equipment 100 may be implemented by more constituent elements than the constituent elements illustrated in FIG. 1 or less constituent elements therethan.

The communication unit 110 communicates with another terminal using a BLE scheme by using Bluetooth low energy (BLE).

Further, the communication unit 110 transmits a power beacon signal for communication with another terminal using the BLE scheme by a control of the control unit 120.

The control unit 120 executes an overall control function of the wireless charging equipment 100.

Further, the control unit 120 generates the power beacon signal at a predetermined time interval in the A4WP scheme wireless charging.

Further, the control unit 120 transmits the power beacon signal at the predetermined time interval through the communication unit 110.

Further, the control unit 120 receives a PRU advertisement signal (alternatively, a control signal) transmitted from the terminal 200 receiving the corresponding power beacon signal through the communication unit 110 in response to the transmitted power beacon signal.

Further, the control unit 120 communicates with the corresponding terminal 200 adjacent to the corresponding wireless charging equipment 100 based on the received PRU advertisement signal.

Further, the control unit 120 receives the PRU static parameter or the PRU dynamic parameter added with at least one of the IMSI, the IMEI, and the affiliated company information transmitted from the terminal 200 through the communication unit 110. Here, the IMSI includes a mobile country code (MCC), a mobile network code (MNC), a mobile subscriber identification number (MSI), a country mobile subscriber identification number (MSIN), and the like. Further, the IMEI includes a unique serial number of the terminal, a manufacturer of the terminal, model information, and the like. Further, the affiliated company information includes information on an affiliated company subscribed by the user of the corresponding terminal 200.

Further, the control unit 120 determines (alternatively, verifies) whether at least one of the IMSI, the IMEI, and the affiliated company information corresponds to the information on the pre-registered (alternatively, predetermined) communication provider or the information on the pre-registered affiliated company based on the IMSI, the IMEI, and the affiliated company information included in the received PRU static parameter or PRU dynamic parameter.

That is, the control unit 120 determines whether the corresponding terminal 200 is the pre-registered communication provider or affiliated company capable of receiving a charging signal based on at least one of the IMSI, the IMEI, and the affiliated company information included in the PRU static parameter or the PRU dynamic parameter.

In this case, the control unit 120 may also determine whether the IMSI or the IMEI included in the received PRU static parameter or PRU dynamic parameter is included in information on a plurality of communication providers corresponding to the pre-registered IMSI or IMEI, or whether the affiliated company information included in the received PRU static parameter or PRU dynamic parameter is included in information on a plurality of pre-registered affiliated companies.

As the determined result, when at least one of the IMSI, the IMEI, and the affiliated company information does not correspond to the pre-registered communication provider information or affiliated company information, the control unit 120 ends the entire process (alternatively, performs a predetermined latch fault process) without transmitting the charging signal to the corresponding terminal 200.

Further, as the determined result, when at least one of the IMSI, the IMEI, and the affiliated company information corresponds to the pre-registered communication provider information or affiliated company information, the control unit 120 generates a charging signal at a predetermined time interval (for example, 250 ms) by determining that the charging signal may be transmitted to the corresponding terminal 200. Here, further, the control unit 120 controls an inductor (not illustrated) and a capacitor (not illustrated) included in the wireless charging equipment 100 to generate the charging signal. In this case, the wireless charging equipment 100 generates a charging signal for wireless charging by a resonance coupling scheme.

Further, the control unit 120 transmits the generated charging signal to the corresponding terminal 200 at the predetermined time interval through the communication unit 110.

As such, the control unit 120 is connected with the terminal 200 including the PRU and then may determine whether the corresponding terminal 200 is the pre-registered terminal capable of receiving the charging signal based on the PRU static parameter or the PRU dynamic parameter transmitted from the terminal 200.

Further, the control unit 120 schedules a time for transmitting the corresponding charging signal to one or more terminals 200 connected with the corresponding wireless charging equipment 100 among time slots (alternatively, time sequence/a total data transmittable time) in order to transmit the charging signal to one or more terminals 200 connected with the corresponding wireless charging equipment 100.

Further, the control unit 120 may also transmit the charging signal generated based on the scheduled time slot to a specific terminal in the terminals 200 connected to the wireless charging equipment 100 at the predetermined time interval (for example, 250 ms).

In this case, in the case of a plurality of terminals 200 connected to the corresponding wireless charging equipment 100, the control unit 120 may individually generate a charging signal for transmitting to each of the plurality of terminals 200 and transmit the individually generated charging signal to each corresponding terminal 200. Further, in the case of the plurality of terminals 200 connected to the corresponding wireless charging equipment 100, the control unit 120 may generate one charging signal for transmitting to each of the plurality of terminals 200 and transmit one generated charging signal to each of the plurality of terminals 200.

Further, in the case of transmitting the charging signal to the corresponding terminal 200, the control unit 120 may also transmit the charging signal to the corresponding terminal 200 based on a control signal (alternatively, a charging signal transmission request signal) (for example, including the PRU dynamic parameter) transmitted from the terminal 200.

As illustrated in FIG. 1, the terminal 200 is constituted by a first communication unit 210, a first control unit 220, and a battery 230. All the constituent elements of the terminal 200 illustrated in FIG. 1 are not required constituent elements, and the terminal 200 may be implemented by more constituent elements than the constituent elements illustrated in FIG. 1 or less constituent elements therethan. Here, the terminal 200 includes a power receiving unit (PRU) (not illustrated).

The first communication unit 210 communicates with another terminal using the BLE scheme by using the BLE.

Further, the first communication unit 210 receives a power beacon signal transmitted from the wireless charging equipment 100.

The first control unit 220 executes an overall control function of the terminal 200. Further, the first control unit 220 transmits the PRU advertisement signal to the wireless charging equipment 100 through the first communication unit 210 in order to request connection (alternatively, communication) to the corresponding wireless charging equipment 100 based on the power beacon signal transmitted from the wireless charging equipment 100 in the A4WP scheme wireless charging.

Further, the first control unit 220 establishes the connection (alternatively, communication) with the corresponding wireless charging equipment 100 based on the transmitted PRU advertisement signal.

Further, the first control unit 220 verifies at least one of an international mobile subscriber identity (IMSI) of a USIM provided in the terminal 200 and unique international mobile equipment identity (IMEI) of the terminal 200. Here, the IMSI includes a mobile country code (MCC), a mobile network code (MNC), a mobile subscriber identity (MSI), a country mobile subscriber identifier number (MSIN), and the like. Further, the IMEI includes a unique serial number of the terminal, a manufacturer of the terminal, model information, and the like.

Further, the first control unit 220 verifies affiliated company information which is information for the affiliated company subscribed by the user of the corresponding terminal 200.

Further, the first control unit 220 adds (alternatively, inserts) at least one of the verified IMSI, IMEI, and affiliated company information to the PRU static parameter.

Further, the first control unit 220 adds (alternatively, inserts) at least one of the verified IMSI, IMEI, and affiliated company information to the PRU dynamic parameter.

Here, when the field number of the verified IMSI or IMEI is larger than the field number usable in the PRU static parameter and the PRU dynamic parameter, the first control unit 220 divides the verified IMSI or IMEI and may also distribute and add the divided IMSI or IMEI to the PRU static parameter and the PRU dynamic parameter, respectively.

Further, the first control unit 220 transmits the PRU static parameter and the PRU dynamic parameter added with at least one of the IMSI, the IMEI, and the affiliated company information to the wireless charging equipment 100 through the first communication unit 210.

Further, the first control unit 220 transmits a control signal (alternatively, a charging signal transmission request signal) (for example, including the PRU dynamic parameter) to the wireless charging equipment 100 at a predetermined time interval.

Further, in the case of being verified as the terminal capable of receiving the charging signal from the corresponding wireless charging equipment 100 by the PRU static parameter or the PRU dynamic parameter added with at least one of the transmitted MSI, IMEI, and affiliated company information, the first control unit 220 controls the charging signal transmitted from the wireless charging equipment 100 to be received through the first communication unit 210 at the predetermined time interval. In this case, the first control unit 220 may also control the charging signal transmitted from the wireless charging equipment 100 to be received through the first communication unit 210 in response to the above transmitted control signal (for example, including the PRU dynamic parameter).

Further, the first control unit 220 charges a battery 230 based on the received charging signal. In this case, the terminal 220 may further include an additional constituent element for charging the corresponding battery 230 by a resonance coupling method with the wireless charging equipment 100.

The battery 230 supplies the power to the corresponding terminal 200.

Further, the battery 230 performs a charging function based on the charging signal transmitted from the wireless charging equipment 100 by a control of the first control unit 220.

Further, as listed in the following Table 1, a PRU control, the PTU static parameter, a PRU alert, a PTU static parameter, a PRU dynamic parameter, and the like may be transmitted between the wireless charging equipment 100 (alternatively, the PTU) and the terminal 200 including the PRU.

TABLE 1

| Characteristic | Data Direction | Properties | Description |
|---|---|---|---|
| PRU Control | PTU → PRU | Write and Read | PRU ON/OFF control. PTU initiates write when command needs to be sent. |
| PTU Static Parameter | PTU → PRU | Write and Read | Contains static characteristics of the PTU. PTU initiates write at least once when new device connects. |
| PRU Alert | PTU ← PRU | Notifications | Notifies the PTU of overvoltage, over-current, over-temperature and self protection conditions of the PRU. |
| PRU Static Parameter | PTU ← PRU | Read | Contains static characteristics of the PRU. PTU initiates read at least once when device connects (can be more). |
| PRU Dynamic Parameter | PTU ← PRU | Read | Contains dynamic characteristics of the PRU. PTU initiates read from each device. |

Further, the following Table 2 represents a structure of the PRU static parameter, and at least one of the IMSI, the IMEI, and the affiliated company information may be added (alternatively, inserted) to an RFU field included in the corresponding PRU static parameter.

TABLE 2

| Field | Octets | Description | Use | Units |
|---|---|---|---|---|
| Optional fields Validity | 1 | Defines which optional fields are populated | Mandatory | |
| Protocol Revision | 1 | A4WP Supported Revision | Mandatory | |
| RFU | 1 | Undefined | N/A | |
| PRU Category | 1 | Category of PRU | Mandatory | |
| PRU Information | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| PRECT_MAX | 1 | PRECT_MAX of the PRU | Mandatory | mW*100 |
| VRECT_MIN_STATIC | 2 | VRECT_MIN (static, first estimate) | Mandatory | mV |
| VRECT_HIGH_STATIC | 2 | VRECT_HIGH (static, first estimate) | Mandatory | mV |
| VRECT_SET | 2 | VRECT_SET | Mandatory | mV |
| Delta R1 value | 2 | Delta R1 caused by PRU | Optional | .01 ohms |
| RFU | 4 | Undefined | N/A | |

Figure 2:
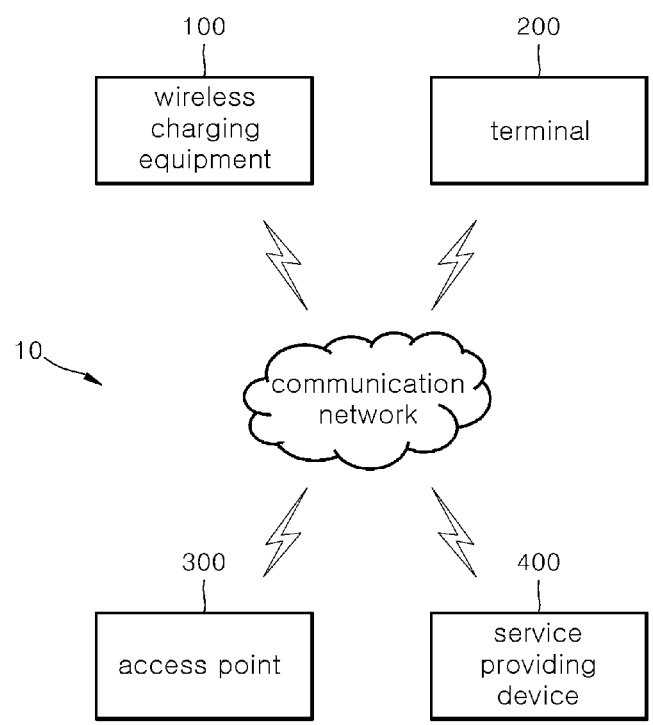
FIG. 2 is a block diagram illustrating a configuration of a wireless charging system according to another embodiment of the present invention.

FIG. 2 is a block diagram illustrating a configuration of a wireless charging system according to another embodiment of the present invention.

As illustrated in FIG. 2, the wireless charging system 10 is constituted by wireless charging equipment 100, a terminal 200, an access point 300, and a service providing device 400. All the constituent elements of the wireless charging system 10 illustrated in FIG. 2 are not required constituent elements, and the wireless charging system 10 may be implemented by more constituent elements than the constituent elements illustrated in FIG. 2 or less constituent elements therethan. Here, the wireless charging equipment 100 and the terminal 200 charge a battery provided in the corresponding terminal 200 based on a charging signal transmitted from the wireless charging equipment 100 through an A4WP scheme (alternatively, a magnetic resonance scheme). Further, the corresponding wireless charging equipment 100 and the terminal 200 uses a BLE for low power in a Bluetooth.

The wireless charging equipment 100 transmits a personal information provision inquiry signal generated when communicating with the terminal 200 or when the terminal 200 is charging to the terminal 200. Thereafter, the terminal 200 transmits a response signal to the wireless charging equipment 100 in response to the personal information provision inquiry signal transmitted from the wireless charging equipment 100 to the wireless charging equipment 100. In this case, the response signal includes information (for example, including agreement on the personal information provision, disagreement on the personal information provision, and the like) representing whether agreement for the personal information provision exists according to a free internet usage. Thereafter, the wireless charging equipment 100 transmits access information to the access point 300 installed in the store where the wireless charging equipment 100 is provided to the terminal 200 based on the response signal (for example, including the agreement on the personal information provision) transmitted from the terminal 200. Thereafter, the terminal 200 uses the internet for free through the corresponding access point 300 based on the access information to the access point 300. Further, the access point 300 collects internet usage information of the accessed terminal 200 and provides the collected internet usage information of the terminal 200 to the service providing device 400. Thereafter, the service providing device 400 generates additional service information based on the internet usage information of the terminal 200 and provides the generated additional service information to the terminal 200 through the corresponding access point 300. Thereafter, the terminal 200 receives and displays the additional service information provided from the service providing device 400.

When the terminal 200 is connected to the wireless charging equipment 100 or when the battery 230 included in the terminal 200 is charging by transmitting the charging signal to the terminal 200 from the wireless charging equipment 100, the control unit 120 generates the personal information provision inquiry signal. Here, the personal information provision inquiry signal may be a signal for inquiring whether to agree to collect (alternatively, acquire) the internet usage information of the corresponding terminal 200 in order to use the internet for free through the access point 300 installed in the store including the wireless charging equipment 100 in the terminal 200 during charging. In this case, the control unit 120 transmits to the terminal 200 a personal information provision inquiry signal generated for an empty period without transceiving the charging signal to the terminal 200.

Further, the control unit 120 transmits the generated personal information provision inquiry signal to the corresponding terminal 200 through the communication unit 110.

Further, the control unit 120 receives a response signal transmitted from the terminal 200 through the communication unit 110 in response to the transmitted personal information provision inquiry signal. Here, the response signal includes information (for example, including agreement on the personal information provision, disagreement on the personal information provision, and the like) representing whether there is the agreement on the personal information provision according to a free internet usage of the corresponding terminal 200.

Further, the control unit 120 performs the corresponding function included in the response signal based on the received response signal.

That is, when the information representing the disagreement on the personal information provision is included in the response signal, the control unit 120 does not provide information on the corresponding access point 300 capable of using the internet for free to the corresponding terminal 200 based on the information representing the disagreement on the personal information provision, but provides the charging signal for charging the battery 230 to the corresponding terminal 200 at a predetermined interval.

Further, when the information representing the agreement on the personal information provision is included in the response signal, the control unit 120 transmits the access information on the access point 300 installed in the store where the wireless charging equipment 100 is provided to the terminal 200 through the communication unit 110. In this case, the control unit 120 may transmit the access information on a BLE or a Wi-Fi module included in the communication unit 110 to the terminal 200 through the communication unit 110 so as to use the internet for free in the corresponding terminal 200 through the communication unit 110 including the BLE or the Wi-Fi module included (alternatively, provided/installed) in the corresponding wireless charging equipment 100.

Further, when the terminal 200 accesses the corresponding BLE or Wi-Fi module based on the access information on the BLE or the Wi-Fi module included in the communication unit 110, the control unit 120 accesses the terminal 200 through the corresponding BLE or Wi-Fi module.

Further, the control unit 120 collects (alternatively, acquires) the internet usage information used by the terminal 200 through the corresponding BLE or Wi-Fi module. Here, the internet usage information includes access site information (for example, URL information) of the terminal 200, a keyword, a search result according to the corresponding keyword, a time staying at an access site, contents selected (alternatively, touched) in the access site, a usage time, information on a used social network service (SNS), a time staying in the corresponding SNS, and the like.

Further, the control unit 120 provides the collected internet usage information of the terminal 200 to the service providing device 400.

Further, the control unit 120 provides the additional service information provided from the service providing device 400 to the terminal 200 in response to the provided internet usage information of the terminal 200.

The first control unit 220 receives the personal information provision inquiry signal transmitted from the corresponding wireless charging equipment 100 through the first communication unit 210 for an empty period without transceiving the charging signal to the wireless charging equipment 100. Here, the personal information provision inquiry signal may be a signal for inquiring whether to agree to collect (alternatively, acquire) the internet usage information of the corresponding terminal 200 in order to use the internet for free through the access point 300 installed in the store including the wireless charging equipment 100 in the terminal 200 during charging.

Further, the first control unit 220 generates a response signal based on the received personal information provision inquiry signal. Here, the response signal includes information (for example, including agreement on the personal information provision, disagreement on the personal information provision, and the like) representing whether there is the agreement on the personal information provision according to a free internet usage of the corresponding terminal 200.

Further, the first control unit 220 transmits the generated response signal to the wireless charging equipment 100 through the first communication unit 210.

Further, the first control unit 220 receives access information (alternatively, access information on a BLE or a Wi-Fi included in the communication unit 110 in the wireless charging equipment 100) on the access point 300 transmitted from the wireless charging equipment 100 through the first communication unit 210 in response to the transmitted response signal.

Further, the first control unit 220 accesses (alternatively, communicates with) the corresponding access point 300 (alternatively, the BLE or the Wi-Fi included in the communication unit 110) based on the access information on the access point 300 (alternatively, the access information on the BLE or the Wi-Fi included in the communication unit 110 in the wireless charging equipment 100). In this case, the first control unit 220 verifies at least one of an IMSI of a USIM provided in the terminal 200 and a unique IMEI of the terminal 200. Here, the IMSI includes a mobile country code (MCC), a mobile network code (MNC), a mobile subscriber identity (MSI), a country mobile subscriber identifier number (MSIN), and the like. Further, the IMEI includes a unique serial number of the terminal, a manufacturer of the terminal, model information, and the like. Further, the first control unit 220 may also provide at least one of the verified IMSI and IMEI to the accessed access point 300 (alternatively, the communication unit 110 including the BLE or the Wi-Fi) through the first communication unit 220.

Further, the first control unit 220 uses the internet or the like for free through the accessed access point 300 (alternatively, the BLE or the Wi-Fi included in the communication unit 110). In this case, the internet usage information of the terminal 200 may be collected through the corresponding access point 300 (alternatively, the BLE or the Wi-Fi included in the communication unit 110).

Further, the first control unit 220 receives the additional service information transmitted (alternatively, provided) from the service providing device 400 through the first communication unit 210 based on the internet usage information of the terminal 200 collected according to internet usage through the access point 300 (alternatively, the BLE or the Wi-Fi included in the communication unit 110). Here, the additional service information includes various contents curation such as promotion information, coupon information, marketing information, review information for each product, news information, and music information for each store where the wireless charging equipment 100 (alternatively, the access point 300) is provided.

Further, the first control unit 220 displays the received additional service information on a display unit (not illustrated).

Further, the first control unit 220 performs a purchase procedure (alternatively, a payment function) for a specific product by interlocking with the service providing device 400 based on the displayed additional service information.

Further, even when the charging for the corresponding battery 230 is completed (alternatively, stops) by interlocking between the wireless charging equipment 100 and the terminal 200 (alternatively, when the corresponding terminal 200 is in a non-contact state with the wireless charging equipment 100), as long as the terminal 200 is positioned within a service radius of the corresponding access point 300, the first control unit 220 may continuously use the internet through the access point 300.

The access point (AP) 300 is installed (alternatively, provided) in any store provided with the wireless charging equipment 100.

Further, the AP 300 communicates with the terminal 200 making an attempt at accessing (alternatively, communicating) based on the access information on the AP 300.

Further, the AP 300 collects (alternatively, acquires) the internet usage information of the connected terminal 200. Here, the internet usage information includes access site information (for example, URL information) of the terminal 200, a keyword, a search result according to the corresponding keyword, a time staying at an access site, contents selected (alternatively, touched) in the access site, a usage time, information on a used social network service (SNS), a time staying in the corresponding SNS, and the like.

Further, the access point 300 provides (alternatively, transmits) the collected internet usage information of the terminal 200 to the service providing device 400 (alternatively, the wireless charging equipment 100).

Further, the AP 300 transmits (alternatively, provides) the additional service information transmitted from the service providing device 400 to the corresponding terminal 200 in response to the transmitted internet usage information of the terminal 200. Here, the additional service information includes various contents curation such as promotion information, coupon information, marketing information, review information for each product, news information, and music information for each store provided with the wireless charging equipment 100 (alternatively, the AP 300).

The service providing device (alternatively, server) 400 receives the internet usage information of the terminal 200 transmitted from the AP 300 or the wireless charging equipment 100.

Further, the service providing device 400 generates additional service information based on the received internet usage information of the terminal 200. Here, the additional service information includes various contents curation such as promotion information, coupon information, marketing information, review information for each product, news information, and music information for each store provided with the wireless charging equipment 100 (alternatively, the AP 300).

Further, the service providing device 400 provides the generated additional service information to the terminal 200 through the corresponding AP 300 or the wireless charging equipment 100 in response to the received internet usage information of the terminal 200.

In the embodiment of the present invention, it is described that the function of generating and providing the additional service information is performed in the service providing device 400, but it is not limited thereto. In addition, the function of generating and providing the additional service information may also be performed in the wireless charging equipment 100 based on the internet usage information of the terminal 200.

Figure 3:
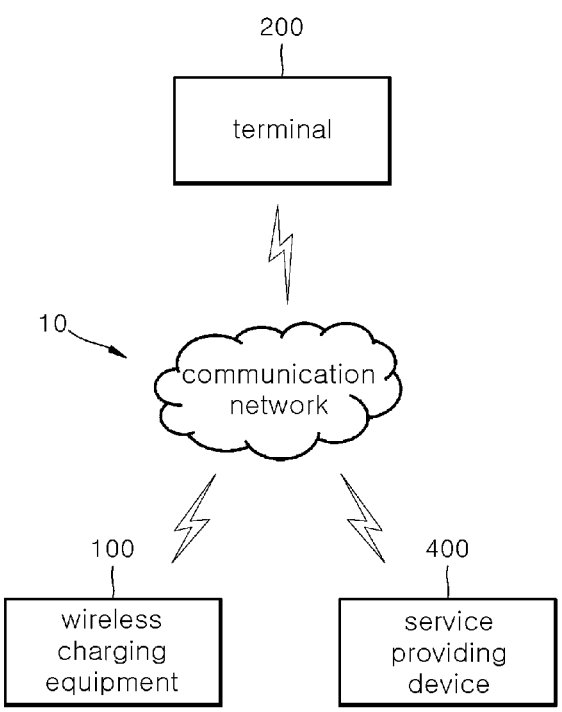
FIG. 3 is a block diagram illustrating a configuration of a wireless charging system according to yet another embodiment of the present invention.

FIG. 3 is a block diagram illustrating a configuration of a wireless charging system 10 according to yet another embodiment of the present invention.

As illustrated in FIG. 3, the wireless charging system 10 is constituted by wireless charging equipment 100, a terminal 200, and a service providing device 400. All the constituent elements of the wireless charging system 10 illustrated in FIG. 3 are not required constituent elements, and the wireless charging system 10 may be implemented by more constituent elements than the constituent elements illustrated in FIG. 3 or less constituent elements therethan. Here, the terminal 200 and the wireless charging equipment 100 charge a battery provided in the corresponding terminal 200 based on a charging signal transmitted from the wireless charging equipment 100 through an A4WP scheme (alternatively, a magnetic resonance scheme). Further, the corresponding terminal 200 and the wireless charging equipment 100 use a BLE for low power in a Bluetooth. Further, the wireless charging equipment 100 and the service providing device 400 communicate with each other by an HTTP scheme.

In the wireless charging equipment 100, information on whether there are one or more terminals while charging is transmitted to the service providing device 400 through the corresponding wireless charging equipment 100. Thereafter, the service providing device 400 determines whether the user of the corresponding terminal 200 is a pre-registered user based on the information on the corresponding terminal 200 and transmits information representing whether the corresponding terminal 200 is charged based on the determined result to the wireless charging equipment 100. Thereafter, the wireless charging equipment 100 performs a charging continuation or charging stop function for the corresponding terminal 200 based on the information representing whether the corresponding terminal 200 is charged which is transmitted from the service providing device 400. Thereafter, when the charging for the terminal 200 stops or is completed, the wireless charging equipment 100 provides to the service providing device 400 information representing that the connection of the terminal 200 while charging is completed.

The communication unit 110 communicates with the terminal 200 using the BLE scheme and the like by using the BLE.

Further, the communication unit 110 communicates with the service providing device 400 using the HTTP scheme by the control of the control unit 120.

Further, the control unit 120 may also transmit the charging signal to the corresponding terminal 200 based on a control signal (alternatively, a charging signal transmission request signal) (for example, including the PRU dynamic parameter) transmitted from the terminal 200.

Further, the control unit 120 communicates with the service providing device 400 by using a HTTP protocol through the communication unit 110.

Further, the control unit 120 transmits a state report request signal including state information of the wireless charging equipment 100 to the service providing device 400 through the communication unit 110 at a predetermined time interval (for example, at an interval of 10 minutes). Here, the state report request signal includes information representing whether the wireless charging equipment 100 is in a preparation state, information representing whether the power of the wireless charging equipment 100 is in an on state and a service preparation state, information representing whether the wireless charging equipment 100 is performing the charging function, identification information of the corresponding wireless charging equipment 100, and the like.

Here, in the case where there is no terminal 200 while charging through the wireless charging equipment 100, when it is the predetermined time interval, the control unit 120 transmits the corresponding state report request signal to the service providing device 400 through the communication unit 110. Further, when the response signal is not received from the service providing device 400 in response to the transmitted state report request signal, the control unit 120 does not re-transmit the corresponding state report request signal, performs a time clears function, and maintains a non-synchronization state with the corresponding service providing device 400. Thereafter, when the response signal is received in response to the transmitted state report request signal, the control unit 120 maintains the synchronization state with the service providing device 400 again at the corresponding time.

Further, in the case where there is the terminal 200 while charging through the wireless charging equipment 100, in the state where the corresponding terminal 200 is charging by the charging signal provided from the wireless charging equipment 100 by interlocking between the terminal 200 and the wireless charging equipment 100, when the predetermined time interval arrives, the control unit 120 may transmit the corresponding state report request signal to the service providing device 400 through the communication unit 110.

Further, the control unit 120 receives a state report response signal transmitted from the service providing device 400 through the communication unit 110 in response to the transmitted state report request signal. Here, the state report response signal includes information representing that the state report request signal was normally received in the service providing device 400, and the like.

Further, when the terminal 200 for charging is connected to the wireless charging equipment 100, the control unit 120 receives the PRU advertisement signal transmitted from the terminal 200 through the communication unit 110. Here, the PRU advertisement signal includes unique information (alternatively, a sharing ID) of the PRU included in the corresponding terminal 200, version information of the corresponding PRU, a manufacturing number of the corresponding PRU, identification information of the corresponding terminal 200, and the like. In this case, the identification information of the terminal 200 includes an MDN, a mobile IP, a mobile MAC, Sim (subscriber identification module) card unique information, a serial number, and the like. Further, the identification information of the terminal 200 may also include an IMSI of a USIM provided in the terminal 200, a unique IMEI of the terminal 200, and the like.

Further, when the terminal 200 for charging is connected to the wireless charging equipment 100, the control unit 120 transmits a PRU recognition request signal to the service providing device 400 communicating by the HTTP scheme through the communication unit 110. Here, the PRU recognition request signal includes the PRU advertisement signal transmitted from the terminal 200, identification information of the wireless charging equipment 100, and the like.

Further, when the control unit 120 does not receive a PRU recognition response signal which is a response signal transmitted from the service providing device 400 within a predetermined response time, the control unit 120 re-transmits the PRU recognition request signal to the service providing device 400 through the communication unit 110. In this case, even after the corresponding PRU recognition request signal is re-transmitted by a predetermined number of times (for example, six times), when the response signal is not transmitted from the service providing device 400, the corresponding control unit 120 stops (alternatively, interrupts) a process of transmitting the PRU recognition request signal to the service providing device 400.

As such, after the process of transmitting the PRU recognition request signal to the service providing device 400 stops, normal transmission and reception of the state report request signal and the state report response signal which are transmitted and received at the predetermined time interval between the wireless charging equipment 100 and the service providing device 400 is completed, the control unit 120 transmits a first event report request signal including the above unsuccessfully transmitted (alternatively, above transmission-stopped/interrupted) PRU recognition request signal to the service providing device 400 through the communication unit 110. In this case, the terminal 200 continuously performs the charging function by interlocking with the wireless charging equipment 100.

Further, the control unit 120 receives a first event report response signal transmitted from the service providing device 400 through the communication unit 110 in response to the transmitted first event report request signal. Here, the first event report response signal includes information (for example, including charging continuation information or charging stop information) on whether the corresponding terminal 200 is charged which is generated based on the PRU advertisement signal included in the first event report request signal by a control of the service providing device 400, the identification information of the corresponding terminal 200, the identification information of the corresponding wireless charging equipment 100, and the like.

Further, the control unit 120 receives the PRU recognition response signal transmitted from the service providing device 400 through the communication unit 110 in response to the transmitted PRU recognition request signal. Here, the PRU recognition response signal includes information (for example, including charging continuation information or charging stop information) on whether the corresponding terminal 200 is charged which is generated based on the PRU advertisement signal included in the PRU recognition request signal by a control of the service providing device 400, the identification information of the corresponding terminal 200, the identification information of the corresponding wireless charging equipment 100, and the like.

Further, the control unit 120 performs an authentication process for the terminal 200 while charging based on the received first event report response signal or the PRU recognition response signal.

That is, the control unit 120 verifies charging continuation information or charging stop information included in the received PRU recognition response signal to determine (alternatively, verify) whether the charging for the terminal 200 while charging is continued.

Further, the control unit 120 verifies charging continuation information or charging stop information included in the received first event report response signal to determine whether the charging for the terminal 200 while charging is continued.

As the authenticated result, when the charging stop information is included in the received first event report response signal or PRU recognition response signal, the control unit 120 determines that the corresponding terminal 200 while charging through the corresponding wireless charging equipment 100 is not the pre-registered terminal (alternatively, a user pre-registered in the terminal/service providing device 400 pre-registered in the service providing device 400) to stop (alternatively, end) the charging for the corresponding terminal 200.

Further, as the authenticated result, when the charging continuation information is included in the received first event report response signal or PRU recognition response signal, the control unit 120 determines that the corresponding terminal 200 while charging through the corresponding wireless charging equipment 100 is the pre-registered terminal (alternatively, a user pre-registered in the terminal/service providing device 400 pre-registered in the service providing device 400) to continuously perform the charging function for the corresponding terminal 200.

Further, when the charging for the terminal 200 stops or the charging for the corresponding terminal 200 is completed, the control unit 120 transmits a PRU end request signal to the service providing device 400 through the communication unit 110. Here, the PRU end request signal includes access time information of the corresponding terminal 200 performing the charging function through the wireless charging equipment 100, charging start time information, the identification information of the corresponding terminal 200, the identification information of the corresponding wireless charging equipment 100, and the like.

Further, when the control unit 120 does not receive a PRU end response signal which is a response signal transmitted from the service providing device 400 in response to the PRU end request signal transmitted within a predetermined response time, the control unit 120 re-transmits the PRU end request signal to the service providing device 400 through the communication unit 110. In this case, even after the corresponding PRU end request signal is re-transmitted by a predetermined number of times (for example, six times), when the response signal is not transmitted from the service providing device 400, the corresponding control unit 120 stops (alternatively, interrupts) a process of transmitting the PRU end request signal to the service providing device 400.

As such, after the process of transmitting the PRU end request signal to the service providing device 400 stops, normal transmission and reception of the state report request signal and the state report response signal which are transmitted and received at the predetermined time interval between the wireless charging equipment 100 and the service providing device 400 is completed, the control unit 120 transmits a second event report request signal including the above unsuccessful transmitted (alternatively, above transmission-stopped/interrupted) PRU end request signal to the service providing device 400 through the communication unit 110.

Further, the control unit 120 receives a second event report response signal transmitted from the service providing device 400 through the communication unit 110 in response to the transmitted second event report request signal. Here, the second event report response signal includes charging end verification information on the corresponding terminal 200, the identification information of the corresponding terminal 200, the identification information of the corresponding wireless charging equipment 100, and the like.

Further, the control unit 120 receives the PRU end response signal transmitted from the service providing device 400 in response to the transmitted PRU end request signal. Here, the PRU end response signal includes the charging end verification information on the corresponding terminal 200, the identification information of the terminal 200, the identification information of the wireless charging equipment 100, and the like.

Further, in the case where connection with the terminal 200 while charging abnormally ends (for example, a case where the terminal 200 while charging is removed, a case where the terminal 200 while charging is out of a communication distance from the wireless charging equipment 100, a case where power of the terminal 200 while charging is off, a case where a system error occurs while charging, and the like), the control unit 120 transmits the PRU end request signal including information representing that the connection with the terminal 200 abnormally ends to the service providing device 400 through the communication unit 110. In this case, the PRU end request signal may further include the access time information of the corresponding terminal 200 performing the charging function through the wireless charging equipment 100, the charging start time information, the identification information of the corresponding terminal 200, the identification information of the corresponding wireless charging equipment 100, and the like in addition to the information representing that the connection with the terminal 200 abnormally ends.

Further, the control unit 120 receives the PRU end response signal transmitted from the service providing device 400 in response to the transmitted PRU end request signal.

Further, the first control unit 220 transmits the control signal (for example, the PRU advertisement signal) to the wireless charging equipment 100 through the first communication unit 210 in order to request connection (alternatively, communication) to the corresponding wireless charging equipment 100 based on the power beacon signal transmitted from the wireless charging equipment 100, in the A4WP scheme wireless charging. Here, the PRU advertisement signal includes unique information (alternatively, a sharing ID) of the PRU included in the corresponding terminal 200, version information of the corresponding PRU, a manufacturing number of the corresponding PRU, identification information of the corresponding terminal 200, and the like.

Further, when the terminal 200 exists in a BLE range of the wireless charging equipment 100, the first control unit 220 communicates with the wireless charging equipment 100. Further, the first control unit 220 charges the battery 230 included in the terminal 200 based on the charging signal transmitted from the wireless charging equipment 100.

Further, while wirelessly charging by interlocking with the wireless charging equipment 100, when the authentication for the corresponding terminal 200 by the wireless charging equipment 100 is unsuccessful, the first control unit 220 ends the communication with the wireless charging equipment 100 (alternatively, the charging function).

Further, when the charging for the battery 230 is completed by interlocking with the wireless charging equipment 100, the first control unit 220 ends the communication (alternatively, the charging function) by interlocking with the wireless charging equipment 100.

As such, the terminal 200 performs the charging function through the wireless charging equipment 100, and when the charging stop for the corresponding terminal 200 is determined by interlocking between the wireless charging equipment 100 and the service providing device 400 while wirelessly charging (alternatively, the authentication for the corresponding terminal 200 is unsuccessful), the terminal 200 ends the charging function through the corresponding wireless charging equipment 100 by the control of the wireless charging equipment 100.

Figure 4:
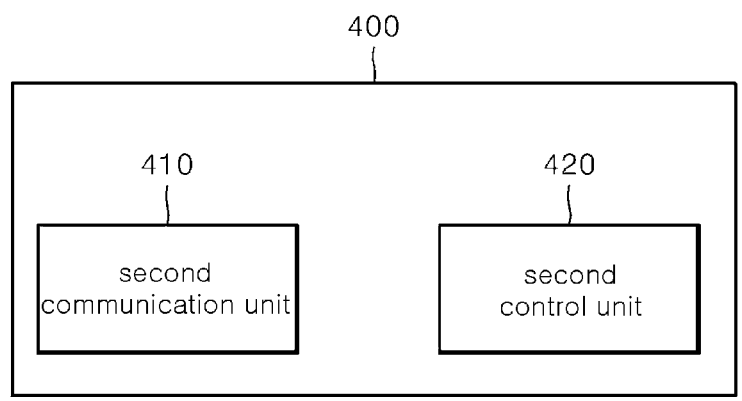
FIG. 4 is a block diagram illustrating a configuration of a service providing device according to the embodiment of the present invention.

As illustrated in FIG. 4, the service providing device 400 is constituted by a second communication unit 410 and a second control unit 420. All of the constituent elements of the service providing device 400 illustrated in FIG. 4 are not required constituent elements, and the service providing device 400 may be implemented by more constituent elements than the constituent elements illustrated in FIG. 4 or less constituent elements therethan.

The second communication unit 410 communicates with the terminal 200, the wireless charging equipment 100, and the like by a wired/wireless communication method. In this case, when communicating with the wireless charging equipment 100, the second communication unit 410 may communicate with the wireless charging equipment 100 and the like by using the HTTP scheme.

Further, the second communication unit 410 receives a state report request signal transmitted from the wireless charging equipment 100 by a control of the second control unit 420. Here, the state report request signal includes information representing whether the wireless charging equipment 100 is in a preparation state, information representing whether the power of the wireless charging equipment 100 is in an on state and a service preparation state, information representing whether the wireless charging equipment 100 is performing the charging function, identification information of the corresponding wireless charging equipment 100, and the like.

The second control unit 420 executes an overall control function of the service providing device 400.

Further, the second control unit 420 transmits a state report response signal to the wireless charging equipment 100 through the second communication unit 410 in response to the state report request signal transmitted from the wireless charging equipment 100 at a predetermined time interval. Here, the state report response signal includes information representing that the state report request signal was normally received in the service providing device 400, and the like.

Further, the second control unit 420 receives a PRU recognition request signal transmitted from the wireless charging equipment 100 through the second communication unit 410. Here, the PRU recognition request signal includes the PRU advertisement signal transmitted from the terminal 200, identification information of the wireless charging equipment 100, and the like.

Further, the second control unit 420 transmits a PRU recognition response signal to the wireless charging equipment 100 through the second communication unit 410 in response to the received PRU recognition request signal. Here, the PRU recognition response signal includes information on whether the corresponding terminal 200 is charged which is generated based on the PRU advertisement signal included in the PRU recognition request signal by a control of the second control unit 420, the identification information of the corresponding terminal 200, the identification information of the corresponding wireless charging equipment 100, and the like.

That is, the second control unit 420 verifies (alternatively, determines) whether the corresponding terminal 200 is a pre-registered terminal based on the PRU advertisement signal included in the PRU recognition request signal.

As the verified result, when the corresponding terminal 200 is the pre-registered terminal (alternatively, when the corresponding terminal 200 is the terminal subscribing to the service providing device 400), the second control unit 420 generates the PRU recognition response signal including the charging continuation information.

Further, as the verified result, when the corresponding terminal 200 is not the pre-registered terminal (alternatively, when the corresponding terminal 200 is not the terminal subscribing to the service providing device 400), the second control unit 420 generates the PRU recognition response signal including the charging stop information.

Further, the second control unit 420 transmits the generated PRU recognition response signal (for example, the charging continuation information or the charging stop information) to the corresponding wireless charging equipment 100 through the second communication unit 410.

Further, when the charging for the terminal 200 stops or the charging for the corresponding terminal 200 is completed, the second control unit 420 receives a PRU end request signal transmitted from the wireless charging equipment 100 through the second communication unit 410. Here, the PRU end request signal includes access time information of the corresponding terminal 200 performing the charging function through the wireless charging equipment 100, charging start time information, the identification information of the corresponding terminal 200, the identification information of the corresponding wireless charging equipment 100, and the like.

Further, the second control unit 420 transmits a PRU end response signal to the wireless charging equipment 100 through the second communication unit 410 in response to the received PRU end request signal. Here, the PRU end response signal includes the charging end verification information on the corresponding terminal 200, the identification information of the terminal 200, the identification information of the wireless charging equipment 100, and the like.

Further, when normal transmission and reception of the state report request signal and the state report response signal which are transmitted and received at the predetermined time interval between the wireless charging equipment 100 and the service providing device 400, the second control unit 420 receives a first event report request signal transmitted from the wireless charging equipment 100 through the second communication unit 410. Here, the first event report request signal includes a PRU recognition request signal (alternatively, an unsuccessfully transmitted (alternatively, above transmission-stopped/interrupted) PRU recognition request signal).

Further, the second control unit 420 transmits a first event report response signal to the wireless charging equipment 100 through the second communication unit 410 in response to the received first event report request signal. Here, the first event report response signal includes information (for example, including charging continuation information or charging stop information) on whether the corresponding terminal 200 is charged which is generated based on the PRU advertisement signal included in the first event report request signal by a control of the second control unit 420, the identification information of the corresponding terminal 200, the identification information of the corresponding wireless charging equipment 100, and the like.

That is, the second control unit 420 verifies (alternatively, determines) whether the corresponding terminal 200 is a pre-registered terminal based on the PRU advertisement signal included in the received first event report request signal.

As the verified result, when the corresponding terminal 200 is the pre-registered terminal (alternatively, when the corresponding terminal 200 is the terminal subscribing to the service providing device 400), the second control unit 420 generates the first event report response signal including the charging continuation information (alternatively, the PRU recognition response signal).

Further, as the verified result, when the corresponding terminal 200 is not the pre-registered terminal (alternatively, when the corresponding terminal 200 is not the terminal subscribing to the service providing device 400), the second control unit 420 generates the first event report response signal including the charging stop information (alternatively, the PRU recognition response signal).

Further, the second control unit 420 transmits the generated first event report response signal (for example, including the charging continuation information or the charging stop information) to the corresponding wireless charging equipment 100 through the second communication unit 410.

Further, when normal transmission and reception of the state report request signal and the state report response signal which are transmitted and received at the predetermined time interval between the wireless charging equipment 100 and the service providing device 400, the second control unit 420 receives a second event report request signal transmitted from the wireless charging equipment 100 through the second communication unit 410. Here, the second event report request signal includes a PRU end request signal (alternatively, an unsuccessfully transmitted (alternatively, above transmission-stopped/interrupted) PRU end request signal).

Further, the second control unit 420 transmits a second event report response signal to the wireless charging equipment 100 through the second communication unit 410 in response to the received second event report request signal. Here, the second event report response signal includes charging end verification information on the corresponding terminal 200 generated by a control of the service providing device 400, the identification information of the corresponding terminal 200, the identification information of the corresponding wireless charging equipment 100, and the like.

That is, the second control unit 420 verifies that the charging for the terminal 200 stops or the charging is completed and generates the second event report response signal including the charging end verification information on the corresponding terminal 200, the identification information of the corresponding terminal 200, the identification information of the corresponding wireless charging equipment 100, and the like. Further, the second control unit 420 transmits the generated second event report response signal to the wireless charging equipment 100 through the second communication unit 410.

Further, the second control unit 420 generates additional service information based on the charging start time information of the terminal 200 performing the charging function through the corresponding wireless charging equipment 100 transmitted from the wireless charging equipment 100, the access time information to the wireless charging equipment of the terminal 200, and the like.

Further, the second control unit 420 transmits the generated additional service information to the corresponding terminal 200 through the wireless charging equipment 100. Here, the additional service information includes various contents curation such as promotion information for each store provided with the wireless charging equipment 100, coupon information, marketing information, review information for each product, news information, and music information.

Further, when a purchase function (alternatively, a payment function) for a specific product included in the additional service information transmitted to the terminal 200 is requested, the second control unit 420 may also perform the purchase function for the corresponding product by interlocking among the wireless charging equipment 100, the terminal 200, and a POS terminal (not illustrated).

As such, in the A4WP scheme wireless charging, the charging signal may be transmitted to the terminal corresponding to a communication provider or an affiliated company which is pre-registered in the wireless charging equipment.

Further, as such, after the wireless charging equipment and the terminal including the PRU are connected to each other, it may be determined whether the terminal is the terminal corresponding to the communication provider or the affiliated company which is pre-registered in the wireless charging equipment based on the PRU static parameter and the PRU dynamic parameter including at least one of the IMSI and the IMEI of the terminal transmitted to the wireless charging equipment in the terminal.

Further, as such, it is possible to verify whether to agree to provide personal information to the terminal from the wireless charging equipment as an internet access cost and provide access information for an AP in a store when agreeing with providing the personal information to the terminal, when the terminal attempts to be charged through the wireless charging equipment.

Further, as such, it is possible to collect the internet usage information of the terminal transmitted through the AP, when the terminal accesses the corresponding AP based on the access information for the AP in the store provided to the terminal while charging.

Further, the wireless charging equipment may determine whether the terminal while charging exists through the wireless charging equipment and whether the charging for the corresponding terminal is performed based on whether the user of the corresponding terminal is the pre-registered user.

Further, as such, the service providing device may provide additional services to the corresponding terminal based on the charging start time information of the terminal which performs the charging function through the corresponding wireless charging equipment transmitted from the wireless charging equipment, the wireless charging equipment access time information of the terminal, and the like.

Hereinafter, a control method of the wireless charging system according to the present invention will be described in detail with reference to FIGS. 1 to 8.

Figure 5:
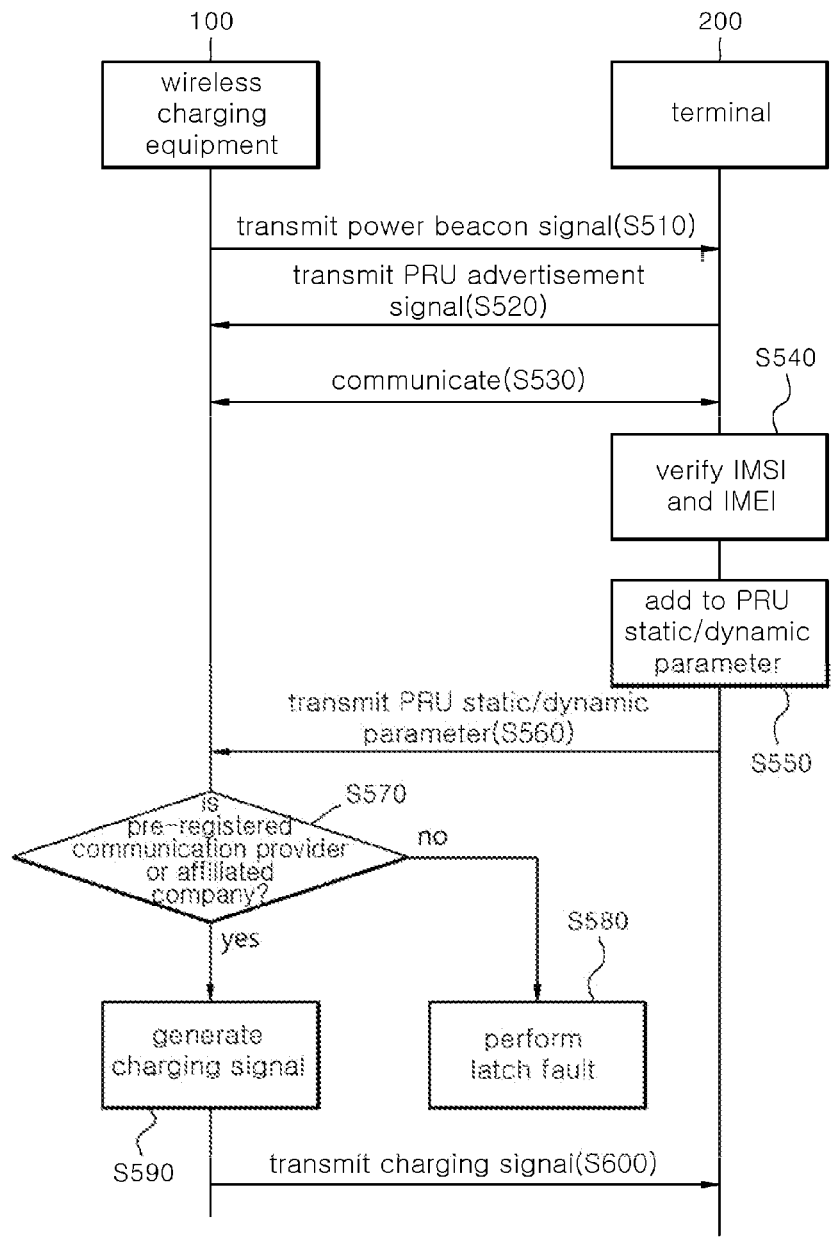
FIG. 5 is a flowchart illustrating a control method of a wireless charging system according to a first embodiment of the present invention.

FIG. 5 is a flowchart illustrating a control method of a wireless charging system according to a first embodiment of the present invention.

First, in A4WP scheme wireless charging, wireless charging equipment 100 (alternatively, a PTU) transmits a power beacon signal at a predetermined time interval.

As an example, the wireless charging equipment 100 transmits (alternatively, propagates) the power beacon signal to a first terminal and a second terminal which include PRUs adjacent to the corresponding wireless charging equipment 100, respectively (S510).

Thereafter, the terminal 200 adjacent to the corresponding wireless charging equipment 100 receives the power beacon signal transmitted from the wireless charging equipment 100.

Further, the terminal 200 generates a PRU advertisement signal in response to the received power beacon signal and transmits the generated PRU advertisement signal to the wireless charging equipment 100.

As an example, each of the first terminal and the second terminal which include the PRUs adjacent to the corresponding wireless charging equipment 100, respectively, receives the power beacon signal transmitted from the wireless charging equipment 100, generates the PRU advertisement signal, and transmits the generated PRU advertisement signal to the wireless charging equipment 100 (S520).

Thereafter, the wireless charging equipment 100 receives the PRU advertisement signal transmitted from the terminal 200 receiving the corresponding power beacon signal in response to the transmitted power beacon signal.

Further, the wireless charging equipment 100 communicates with the corresponding terminal 200 based on the received PRU advertisement signal.

As an example, the wireless charging equipment 100 receives the PRU advertisement signal which is transmitted from each of the first terminal and the second terminal in response to the transmitted power beacon signal and communicates with each of the first terminal and the second terminal based on the received PRU advertisement signal (S530).

Thereafter, the terminal 200 verifies at least one of an IMSI of a USIM provided in the terminal 200 and a unique IMEI of the terminal 200. Here, the IMSI includes a mobile country code (MCC), a mobile network code (MNC), a mobile subscriber identification number (MSI), a country mobile subscriber identification number (MSIN), and the like. Further, the IMEI includes a unique serial number of the terminal, a manufacturer of the terminal, model information, and the like.

As an example, the terminal 200 verifies the IMSI of the USIM provided in the terminal 200.

As another example, the terminal 200 verifies the IMSI of the USIM provided in the terminal 200 and the unique IMEI of the terminal 200 (S540).

Thereafter, the terminal 200 adds at least one of the verified IMSI and IMEI to at least one parameter of the PRU static parameter and the PRU dynamic parameter. In this case, when the field number of the verified IMSI or IMEI is larger than the field number usable in the PRU static parameter and the PRU dynamic parameter, the terminal 200 divides the verified IMSI or IMEI and may also distribute and add the divided IMSI or IMEI to the PRU static parameter and the PRU dynamic parameter, respectively. Further, the terminal 200 may further add specific affiliated company information in addition to the IMSI or the IMEI. Here, the affiliated company information includes information on an affiliated company subscribed by the user of the corresponding terminal 200.

That is, at least one of the verified IMSI, IMEI, and affiliated company information is added (alternatively, inserted) to at least one of a reserved for future use (RFU) field of the PRU static parameter and an RFU field of the PRU dynamic parameter.

As an example, the terminal 200 adds (alternatively, inserts) the verified IMSI to the RFU field of the PRU static parameter and the RFU field of the PRU dynamic parameter, respectively.

As another example, when a capacity (for example, 8 octets) is larger than a capacity (for example, 3 to 6 octets (alternatively, bytes) of the RFU field, the terminal 200 divides the verified IMSI into two parts by 4 octets, adds a first part of the two divided parts to the RFU field of the PRU static parameter, and adds a second part of the two divided parts to the RFU field of the PRU dynamic parameter.

As yet another example, the terminal 200 adds the verified IMSI and IMEI to the RFU field of the PRU static parameter and adds the verified IMSI and IMEI to the RFU field to the PRU dynamic parameter (S550).

Thereafter, the terminal 200 transmits the PRU static parameter or the PRU dynamic parameter added with at least one of the IMSI, the IMEI, and the affiliated company information to the wireless charging equipment 100.

As an example, the terminal 200 transmits the PRU static parameter or the PRU dynamic parameter added with the IMSI to the wireless charging equipment 100.

As another example, the terminal 200 transmits the PRU static parameter added with the first part of the two divided parts to the wireless charging equipment 100 and thereafter, transmits the PRU dynamic parameter added with the second part of the two divided parts to the wireless charging equipment 100.

As yet another example, the terminal 200 transmits the PRU static parameter or the PRU dynamic parameter added with the IMSI and the IMEI to the wireless charging equipment 100 (S560).

Thereafter, the wireless charging equipment 100 receives the PRU static parameter or the PRU dynamic parameter added with at least one of the IMSI, the IMEI, and the affiliated company information transmitted from the terminal 200.

Further, the wireless charging equipment 100 determines (alternatively, verifies) whether at least one of the IMSI, the IMEI, and the affiliated company information corresponds to the pre-registered (alternatively, predetermined) communication provider information or the pre-registered affiliated company information based on at least one of the IMSI, the IMEI, and the affiliated company information included in the received PRU static parameter or PRU dynamic parameter.

As an example, the wireless charging equipment 100 receives the PRU static parameter or the PRU dynamic parameter added with the IMSI transmitted from the terminal 200. Thereafter, the wireless charging equipment 100 determines whether the IMSI included in the received PRU static parameter or PRU dynamic parameter corresponds to the pre-registered communication provider information (S570).

As the determined result, when at least one of the IMSI, the IMEI, and the affiliated company information does not correspond to the pre-registered communication provider information or affiliated company information, the wireless charging equipment 100 ends the entire process (alternatively, performs a predetermined latch fault process) without transmitting the charging signal to the corresponding terminal 200.

As an example, when the IMSI included in the received PRU static parameter or the PRU dynamic parameter is not included in (alternatively, does not correspond to) the pre-registered communication provider information, the wireless charging equipment 100 ends the entire process (S580).

Further, as the determined result, when at least one of the IMSI, the IMEI, and the affiliated company information corresponds to the pre-registered communication provider information or affiliated company information, the wireless charging equipment 100 generates a charging signal at a predetermined time interval (for example, 250 ms) by determining that the charging signal may be transmitted to the corresponding terminal 200.

Further, the wireless charging equipment 100 transmits the generated charging signal to the corresponding terminal 200 at the predetermined time interval.

As an example, when the IMSI included in the received PRU static parameter or the PRU dynamic parameter is included in (alternatively, corresponds to) the pre-registered communication provider information, the wireless charging equipment 100 generates the charging signal and transmits the generated charging signal to the terminal 200 at the predetermined time interval (S590).

Thereafter, the terminal 200 receives the charging signal transmitted from the wireless charging equipment 100 at the predetermined time interval.

Further, the terminal 200 charges the battery 230 provided in the terminal 200 based on the received charging signal (S600).

Figure 6:
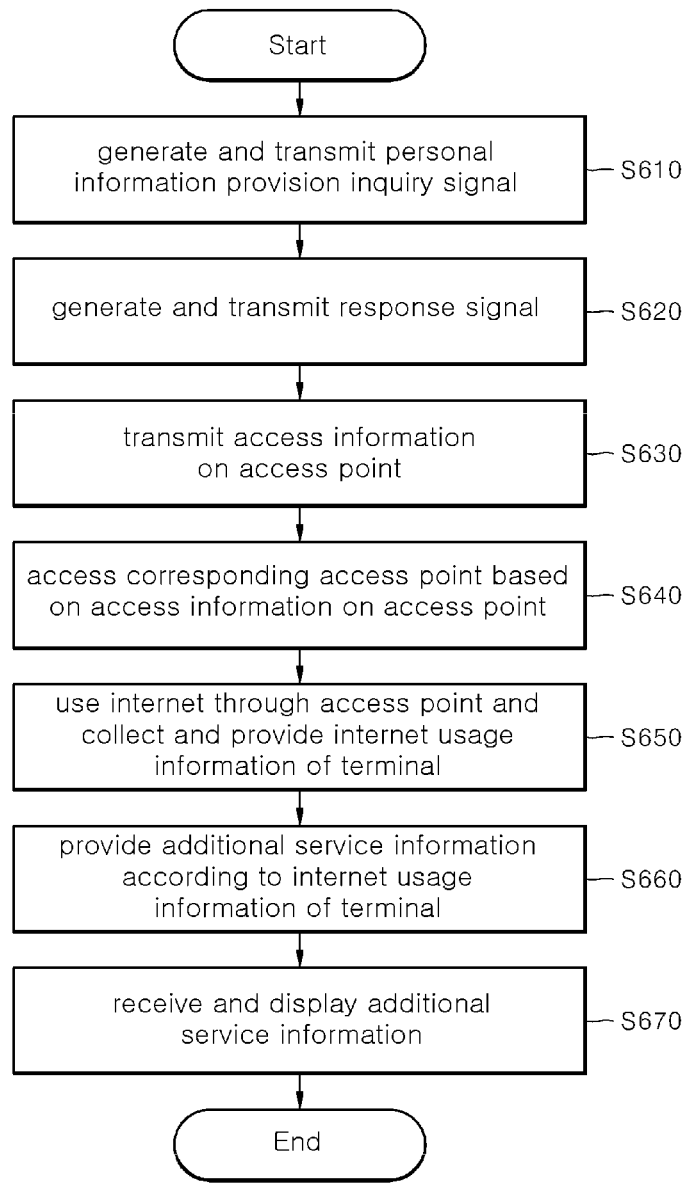
FIG. 6 is a flowchart illustrating a control method of a wireless charging system according to a second embodiment of the present invention.

FIG. 6 is a flowchart illustrating a control method of a wireless charging system according to a second embodiment of the present invention.

First, the wireless charging equipment 100 is connected with (alternatively, starts to communicate with) the terminal 200 or transmits the charging signal to the terminal 200 to generate a personal information provision inquiry signal in a state where the battery 230 included in the terminal 200 is charging. Here, the personal information provision inquiry signal may be a signal for inquiring whether to agree to collect (alternatively, acquire) the internet usage information of the corresponding terminal 200 in order to use the internet for free through the access point 300 installed in the store including the wireless charging equipment 100 in the terminal 200 while charging.

Further, the wireless charging equipment 100 transmits the generated personal information provision inquiry signal to the corresponding terminal 200.

As an example, when the battery 230 included in the terminal 200 is charging based on the charging signal transmitted from the wireless charging equipment 100, the wireless charging equipment 100 generates a personal information provision inquiry signal for inquiring whether to agree on the personal information provision according to the internet access cost (alternatively, in order to use the internet) for free through the access point 300 installed in a store provided with the wireless charging equipment 100 and transmits the generated personal information provision inquiry signal to the corresponding terminal 200 (S610).

Thereafter, the terminal 200 receives the personal information provision inquiry signal transmitted from the wireless charging equipment 100.

Further, the terminal 200 generates a response signal based on the received personal information provision inquiry signal. Here, the response signal includes information (for example, including agreement on the personal information provision, disagreement on the personal information provision, and the like) representing whether to agree on the personal information provision according to a free internal usage of the corresponding terminal 200.

Further, the terminal 200 transmits the generated response signal to the wireless charging equipment 100.

As an example, the terminal 200 generates a response signal including the agreement on the personal information provision. Further, the terminal 200 transmits the generated response signal to the wireless charging equipment 100 in response to the received personal information provision inquiry signal (S620).

Thereafter, the wireless charging equipment 100 receives the response signal transmitted from the terminal 200 in response to the transmitted personal information provision inquiry signal.

Further, the wireless charging equipment 100 performs the corresponding function included in the response signal based on the received response signal.

That is, when the information representing the disagreement on the personal information provision is included in the response signal, the wireless charging equipment 100 does not provide information on the corresponding access point 300 capable of using the internet for free to the corresponding terminal 200 based on the information representing the disagreement on the personal information provision, but provides the charging signal for charging the battery 230 to the corresponding terminal 200 at a predetermined interval.

Further, when the information representing the agreement on the personal information provision is included in the response signal, the wireless charging equipment 100 transmits the access information on the access point 300 installed in the store provided with the wireless charging equipment 100 to the terminal 200. In this case, the wireless charging equipment 100 may transmit access information on a BLE or a Wi-Fi module included in the corresponding communication unit 110 to the terminal 200 so as to use the internet for free in the corresponding terminal 200 through the communication unit 110 including the BLE or the Wi-Fi module included (alternatively, provided/installed) in the corresponding wireless charging equipment 100.

As an example, when the wireless charging equipment 100 receives the response signal including the agreement on the personal information provision transmitted from the terminal 200, the wireless charging equipment 100 verifies the access information on the access point 300 installed in the corresponding store and transmits the verified access information on the access point 300 to the terminal 200 (S630).

Thereafter, the terminal 200 receives the access information on the access point 300 transmitted from the wireless charging equipment 100.

Further, the terminal 200 accesses (alternatively, communicates with) the corresponding access point 300 based on the received access information to the access point 300.

As an example, the terminal 200 communicates with the access point 300 installed in the store where the wireless charging equipment 100 is provided (alternatively, the corresponding terminal is positioned) based on the received access information to the access point 300.

In this case, when the terminal 200 receives the access information on the BLE or the Wi-Fi module included in the communication unit 110 in the wireless charging equipment 100 transmitted from the wireless charging equipment 100, the terminal 200 may access the corresponding BLE or Wi-Fi module based on the received access information on the BLE or the Wi-Fi module (S640).

Thereafter, the terminal 200 uses the internet and the like for free through the corresponding access point 300.

Further, the corresponding access point 300 collects (alternatively, acquires) the internet usage information of the terminal 200. Here, the internet usage information includes access site information (for example, URL information) of the terminal 200, a keyword, a search result according to the corresponding keyword, a time staying at an access site, contents selected (alternatively, touched) in the access site, a usage time, information on a used social network service (SNS), a time staying in the corresponding SNS, and the like.

Further, the access point 300 provides (alternatively, transmits) the collected internet usage information of the terminal 200 to the service providing device 400 (alternatively, the wireless charging equipment 100).

As an example, the access point 300 collects internet usage information of the terminal 200 using the internet through the corresponding access point 300 and provides the collected internet usage information of the terminal 200 to the service providing device 400. In this case, when the predetermined time interval or the transmission request of the service providing device 400 exists, the access point 300 transmits the collected internet usage information of the terminal 200 to the service providing device 400 (S650).

Thereafter, the service providing device 400 receives the internet usage information of the terminal 200 transmitted from the access point 300 (alternatively, the wireless charging equipment 100 including the BLE or the Wi-Fi).

Further, the service providing device 400 generates additional service information based on the received internet usage information of the terminal 200 and provides the generated additional service information to the terminal 200 through the corresponding access point 300 (alternatively, the wireless charging equipment 100). Here, the additional service information includes various contents curation such as promotion information for each store provided with the wireless charging equipment 100 (alternatively, the access point 300), coupon information, marketing information, review information for each product, news information, and music information (S660).

Thereafter, the terminal 200 receives the additional service information provided from the service providing device 400 through the access point 300 (alternatively, the wireless charging equipment 100).

Further, the terminal 200 displays the received additional service information (S670).

Figure 7:
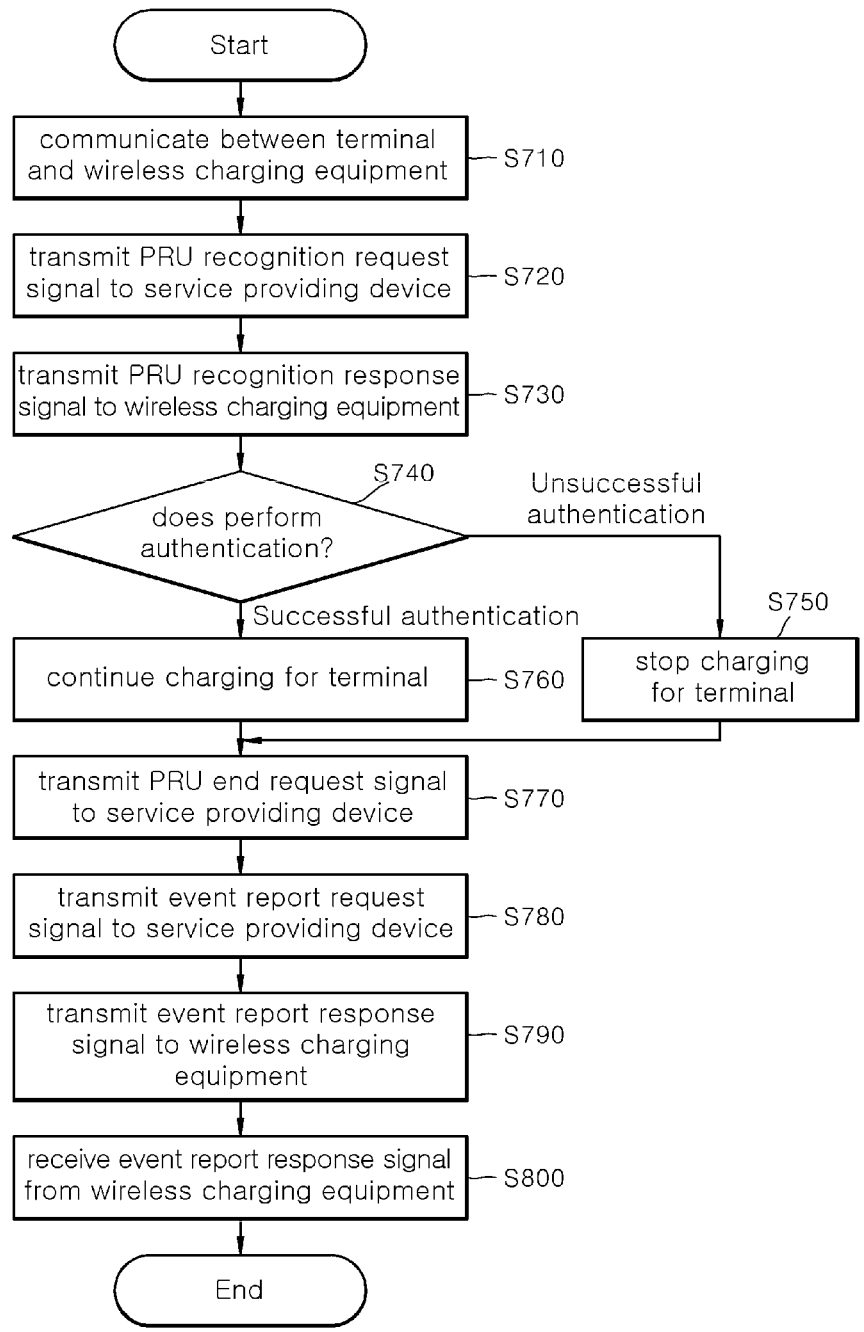
FIG. 7 is a flowchart illustrating a control method of a wireless charging system according to a third embodiment of the present invention.

FIG. 7 is a flowchart illustrating a control method of a wireless charging system according to a third embodiment of the present invention.

First, in A4WP scheme wireless charging, wireless charging equipment 100 (alternatively, a PTU) transmits a power beacon signal at a predetermined time interval. Further, a terminal 200 adjacent to the corresponding wireless charging equipment 100 receives the power beacon signal transmitted from the wireless charging equipment 100.

Further, the terminal 200 generates a PRU advertisement signal in response to the power beacon signal and transmits the generated PRU advertisement signal to the wireless charging equipment 100. Here, the PRU advertisement signal includes unique information (alternatively, a sharing ID) of a PRU included in the corresponding terminal 200, version information of the corresponding PRU, a manufacturing number of the corresponding PRU, identification information of the corresponding terminal 200, and the like. In this case, the identification information of the terminal 200 includes an MDN, a mobile IP, a mobile MAC, Sim (subscriber identification module) card unique information, a serial number, and the like. Further, the identification information of the terminal 200 may also include an IMSI of a USIM provided in the terminal 200, a unique IMEI of the terminal 200, and the like.

Further, the wireless charging equipment 100 receives the PRU advertisement signal transmitted from the terminal 200 receiving the corresponding power beacon signal in response to the transmitted power beacon signal.

Further, the wireless charging equipment 100 communicates with the corresponding terminal 200 based on the received PRU advertisement signal.

As an example, the wireless charging equipment 100 transmits (alternatively, propagates) the power beacon signal to the terminal including the PRU adjacent to the corresponding wireless charging equipment 100. Thereafter, the terminal 200 including the PRU adjacent to the corresponding wireless charging equipment 100 receives the power beacon signal transmitted from the wireless charging equipment 100, generates the PRU advertisement signal, and transmits the generated PRU advertisement signal to the wireless charging equipment 100. Thereafter, the wireless charging equipment 100 receives the PRU advertisement signal transmitted from the terminal 200 in response to the transmitted power beacon signal and communicates with the terminal 200 based on the received PRU advertisement signal (S710).

Thereafter, the wireless charging equipment 100 transmits a PRU recognition request signal to the service providing device 400 communicating by an HTTP scheme. Here, the PRU recognition request signal includes the PRU advertisement signal transmitted from the terminal 200, identification information of the wireless charging equipment 100, and the like.

Further, when the wireless charging equipment 100 does not receive a response signal transmitted from the service providing device 400 within a predetermined response time, the corresponding wireless charging equipment 100 re-transmits the PRU recognition request signal to the service providing device 400 by a predetermined number of times.

As an example, the wireless charging equipment 100 transmits the PRU recognition request signal to the service providing device 400 communicating by an HTTP scheme (S720).

Thereafter, the service providing device 400 receives the PRU recognition request signal transmitted from the wireless charging equipment 100.

Further, the service providing device 400 transmits a PRU recognition response signal to the corresponding wireless charging equipment 100 in response to the received PRU recognition request signal. Here, the PRU recognition response signal includes information on whether the corresponding terminal 200 is charged which is generated based on the PRU advertisement signal included in the PRU recognition request signal by a control of the service providing device 400, the identification information of the corresponding terminal 200, the identification information of the corresponding wireless charging equipment 100, and the like.

That is, the service providing device 400 verifies (alternatively, determines) whether the corresponding terminal 200 is a pre-registered terminal based on the PRU advertisement signal included in the PRU recognition request signal. As the determined result, when the corresponding terminal 200 is the pre-registered terminal, the service providing device 400 generates a PRU recognition response signal including charging continuation information, and when the corresponding terminal 200 is not the pre-registered terminal, the service providing device 400 generates a PRU recognition response signal including charging stop information. Further, the service providing device 400 transmits the generated PRU recognition response signal to the corresponding wireless charging equipment 100.

As an example, the service providing device 400 receives the PRU recognition request signal transmitted from the wireless charging equipment 100 and transmits the PRU recognition response signal (for example, including charging continuation information or charging stop information) to the corresponding wireless charging equipment 100 in response to the received PRU recognition request signal (S730).

Thereafter, the wireless charging equipment 100 receives the PRU recognition response signal transmitted from the service providing device 400 in response to the transmitted PRU recognition request signal.

Further, the wireless charging equipment 100 performs an authentication process for the terminal 200 while charging based on the received PRU recognition response signal.

That is, the wireless charging equipment 100 verifies charging continuation information or charging stop information included in the received PRU recognition response signal to determine whether the charging for the terminal 200 while charging is continued.

As an example, the wireless charging equipment 100 performs the authentication process of determining whether the corresponding terminal 200 while charging is the pre-registered terminal through the wireless charging equipment 100 by verifying whether the charging continuation information or the charging stop information is included in the received PRU recognition response signal (S740).

As the authentication result, when the charging stop information is included in the received PRU recognition response signal, the wireless charging equipment 100 stops (alternatively, ends) the charging for the corresponding terminal 200 by determining that the corresponding terminal 200 is not the pre-registered terminal.

As an example, as the authentication result, when the charging stop information is included in the received PRU recognition response signal, the wireless charging equipment 100 stops the charging for the corresponding terminal 200 by determining that the corresponding terminal 200 while charging through the corresponding wireless charging equipment 100 is not the pre-registered terminal (S750).

Further, as the authentication result, when the charging continuation information is included in the received PRU recognition response signal, the wireless charging equipment 100 continues the charging for the corresponding terminal 200 by determining that the corresponding terminal 200 is the pre-registered terminal. In this case, the wireless charging equipment 100 transmits a state report request signal including state information of the wireless charging equipment 100 to the service providing device 400 at a predetermined time interval and receives a state report response signal transmitted from the service providing device 400 in response to the transmitted state report request signal. Here, the state report request signal includes information representing whether the wireless charging equipment 100 is in a preparation state, information representing whether the power of the wireless charging equipment 100 is in an on state and a service preparation state, information representing whether the wireless charging equipment 100 is performing the charging function, identification information of the corresponding wireless charging equipment 100, and the like. Further, the state report response signal includes information representing that the state report request signal was normally received in the service providing device 400, and the like.

As an example, as the authentication result, when the charging continuation information is included in the received PRU recognition response signal, the wireless charging equipment 100 continues the charging for the corresponding terminal 200 by determining that the corresponding terminal 200 while charging through the corresponding wireless charging equipment 100 is the pre-registered terminal (S760).

Thereafter, when the charging for the terminal 200 stops or the charging for the corresponding terminal 200 is completed, the wireless charging equipment 100 transmits a PRU end request signal to the service providing device 400. Here, the PRU end request signal includes access time information of the corresponding terminal 200 performing the charging function through the wireless charging equipment 100, charging start time information, the identification information of the corresponding terminal 200, the identification information of the corresponding wireless charging equipment 100, and the like.

Further, when the wireless charging equipment 100 does not receive the PRU end response signal as a response signal transmitted from the service providing device 400 within a predetermined response time, the corresponding wireless charging equipment 100 re-transmits the PRU end request signal to the service providing device 400. In this case, even after the corresponding PRU end request signal is re-transmitted by a predetermined number of times (for example, six times), when the response signal is not transmitted from the service providing device 400, the corresponding wireless charging equipment 100 stops (alternatively, interrupts) a process of transmitting the PRU end request signal to the service providing device 400.

As an example, when the charging for the terminal 200 stops or the charging for the corresponding terminal 200 is completed, the wireless charging equipment 100 transmits a PRU end request signal to the service providing device 400. In this case, even after the corresponding PRU end request signal is re-transmitted by the predetermined number of times (for example, six times), when the response signal is not transmitted from the service providing device 400, the corresponding wireless charging equipment 100 stops the process of transmitting the PRU end request signal (S770).

Thereafter, when the normal transmission and reception of the state report request signal and the state report response signal which are transmitted and received between the wireless charging equipment 100 and the service providing device 400 at the predetermined time interval is completed, the wireless charging equipment 100 transmits an event report request signal including the above unsuccessfully transmitted (alternatively, above transmission-stopped/interrupted) PRU end request signal to the service providing device 400.

As an example, the wireless charging equipment 100 transmits a state report request signal including state information of the wireless charging equipment 100 to the service providing device 400 at a predetermined time interval (for example, 10 minutes) and receives a state report response signal transmitted from the service providing device 400 in response to the transmitted state report request signal. Here, the state report request signal includes information representing whether the wireless charging equipment 100 is in a preparation state, information representing whether the power of the wireless charging equipment 100 is in an on state and a service preparation state, information representing whether the wireless charging equipment 100 is performing the charging function, identification information of the corresponding wireless charging equipment 100, and the like. Further, the state report response signal includes information representing that the state report request signal was normally received in the service providing device 400, and the like. Further, when the state report response signal is received, the wireless charging equipment 100 transmits the event report request signal including the above unsuccessfully transmitted (alternatively, above transmission-stopped/interrupted) PRU end request signal to the service providing device 400 (S780).

Thereafter, the service providing device 400 receives the event report request signal transmitted from the wireless charging equipment 100.

Further, the service providing device 400 transmits an event report response signal to the corresponding wireless charging equipment 100 in response to the received event report request signal. Here, the event report response signal includes the PRU end response signal such as the charging end verification information on the corresponding terminal 200, the identification information of the terminal 200, the identification information of the wireless charging equipment 100, and the like.

That is, the service providing device 420 verifies that the charging for the terminal 200 stops or the charging is completed based on the PRU end request signal included in the event report request signal and generates the event report response signal including the charging end verification information on the corresponding terminal 200, the identification information of the corresponding terminal 200, the identification information of the corresponding wireless charging equipment 100, and the like. Further, the service providing device 400 transmits the generated event report response signal to the corresponding wireless charging equipment 100.

As an example, the service providing device 400 receives the event report request signal transmitted from the wireless charging equipment 100 and transmits the event report response signal (for example, including the charging end verification information and the like) to the corresponding wireless charging equipment 100 in response to the received event report request signal (S790).

Thereafter, the wireless charging equipment 100 receives the event report response signal transmitted from the service providing device 400 in response to the transmitted event report request signal.

Further, the wireless charging equipment 100 and the service providing device 400 transmits and receives the state report request signal and the state report response signal at the predetermined time interval.

As an example, the wireless charging equipment 100 receives the event report response signal transmitted from the service providing device 400 in response to the transmitted event report request signal (S800).

Figure 8:
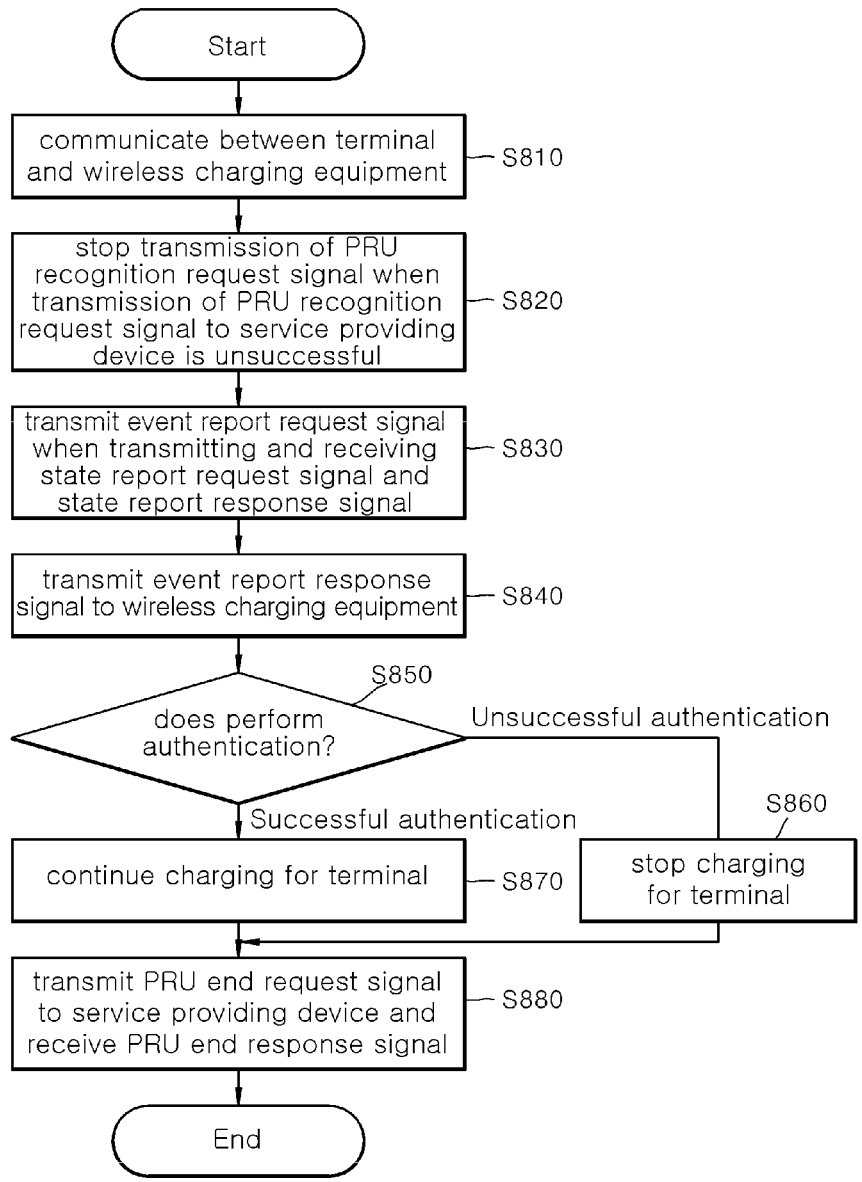
FIG. 8 is a flowchart illustrating a control method of a wireless charging system according to a fourth embodiment of the present invention.

FIG. 8 is a flowchart illustrating a control method of a wireless charging system according to a fourth embodiment of the present invention.

First, in A4WP scheme wireless charging, wireless charging equipment 100 (alternatively, a PTU) transmits a power beacon signal at a predetermined time interval. Further, a terminal 200 adjacent to the corresponding wireless charging equipment 100 receives the power beacon signal transmitted from the wireless charging equipment 100.

Further, the terminal 200 generates a PRU advertisement signal in response to the received power beacon signal and transmits the generated PRU advertisement signal to the wireless charging equipment 100. Here, the PRU advertisement signal includes unique information (alternatively, a sharing ID) of a PRU included in the corresponding terminal 200, version information of the corresponding PRU, a manufacturing number of the corresponding PRU, identification information of the corresponding terminal 200, and the like. In this case, the identification information of the terminal 200 includes an MDN, a mobile IP, a mobile MAC, Sim (subscriber identification module) card unique information, a serial number, and the like. Further, the identification information of the terminal 200 may also include an IMSI of a USIM provided in the terminal 200, a unique IMEI of the terminal 200, and the like.

Further, the wireless charging equipment 100 receives the PRU advertisement signal transmitted from the terminal 200 receiving the corresponding power beacon signal in response to the transmitted power beacon signal.

Further, the wireless charging equipment 100 communicates with the corresponding terminal 200 based on the received PRU advertisement signal.

As an example, the wireless charging equipment 100 transmits (alternatively, propagates) the power beacon signal to the terminal 200 including a PRU adjacent to the corresponding wireless charging equipment 100. Thereafter, the terminal 200 including the PRU adjacent to the corresponding wireless charging equipment 100 receives the power beacon signal transmitted from the wireless charging equipment 100, generates the PRU advertisement signal, and transmits the generated PRU advertisement signal to the wireless charging equipment 100. Thereafter, the wireless charging equipment 100 receives the PRU advertisement signal transmitted from the terminal 200 in response to the transmitted power beacon signal and communicates with the terminal 200 based on the received PRU advertisement signal (S810).

Thereafter, the wireless charging equipment 100 transmits a PRU recognition request signal to the service providing device 400 communicating by an HTTP scheme. Here, the PRU recognition request signal includes the PRU advertisement signal transmitted from the terminal 200, identification information of the wireless charging equipment 100, and the like.

Further, when the wireless charging equipment 100 does not receive a response signal transmitted from the service providing device 400 within a predetermined response time, the corresponding wireless charging equipment 100 re-transmits the PRU recognition request signal to the service providing device 400. In this case, even after the corresponding PRU recognition request signal is re-transmitted by a predetermined number of times (for example, six times), when the response signal is not transmitted from the service providing device 400, the corresponding wireless charging equipment 100 stops (alternatively, interrupts) a process of transmitting the PRU recognition request signal to the service providing device 400.

As an example, the wireless charging equipment 100 transmits the PRU recognition request signal to the service providing device 400 communicating by an HTTP scheme. In this case, even after the corresponding PRU recognition request signal is re-transmitted by the predetermined number of times (for example, six times), when the response signal is not transmitted from the service providing device 400, the corresponding wireless charging equipment 100 stops the process of transmitting the PRU recognition request signal (S820).

Thereafter, when the normal transmission and reception of the state report request signal and the state report response signal which are transmitted and received between the wireless charging equipment 100 and the service providing device 400 at the predetermined time interval is completed, the wireless charging equipment 100 transmits an event report request signal including the above unsuccessfully transmitted (alternatively, above transmission-stopped/interrupted) PRU recognition request signal to the service providing device 400. In this case, the terminal 200 continuously performs the charging function by interlocking with the wireless charging equipment 100.

As an example, the wireless charging equipment 100 transmits a state report request signal including state information of the wireless charging equipment 100 to the service providing device 400 at a predetermined time interval (for example, 10 minutes) and receives a state report response signal transmitted from the service providing device 400 in response to the transmitted state report request signal. Here, the state report request signal includes information representing whether the wireless charging equipment 100 is in a preparation state, information representing whether the power of the wireless charging equipment 100 is in an on state and a service preparation state, information representing whether the wireless charging equipment 100 is performing the charging function, identification information of the corresponding wireless charging equipment 100, and the like. Further, the corresponding state report response signal includes information representing that the state report request signal was normally received in the service providing device 400, and the like. Further, when the state report response signal is received, the wireless charging equipment 100 transmits the event report request signal including the above unsuccessfully transmitted (alternatively, above transmission-stopped/interrupted) PRU recognition request signal to the service providing device 400 (S830).

Thereafter, the service providing device 400 receives the event report request signal transmitted from the wireless charging equipment 100.

Further, the service providing device 400 transmits an event report response signal to the corresponding wireless charging equipment 100 in response to the received event report request signal. Here, the event report request signal includes information on whether the corresponding terminal 200 is charged, which is generated based on the PRU advertisement signal included in the event report request signal by a control of the service providing device 400, the identification information of the corresponding terminal 200, the identification information of the corresponding wireless charging equipment 100, and the like.

That is, the service providing device 400 verifies (alternatively, determines) whether the corresponding terminal 200 is a pre-registered terminal based on the PRU advertisement signal included in the event report request signal. As the determined result, when the corresponding terminal 200 is the pre-registered terminal, the service providing device 400 generates an event report response signal including charging continuation information, and when the corresponding terminal 200 is not the pre-registered terminal, the service providing device 400 generates an event report response signal including charging stop information. Further, the service providing device 400 transmits the generated event report response signal to the corresponding wireless charging equipment 100.

As an example, the service providing device 400 receives the event report request signal transmitted from the wireless charging equipment 100 and transmits the event report response signal (for example, including the charging continuation information or the charging stop information) to the corresponding wireless charging equipment 100 in response to the received event report request signal (S840).

Thereafter, the wireless charging equipment 100 receives the event report response signal transmitted from the service providing device 400 in response to the transmitted event report request signal.

Further, the wireless charging equipment 100 performs an authentication process for the terminal 200 while charging based on the received event report response signal.

That is, the wireless charging equipment 100 verifies charging continuation information or charging stop information included in the received event report response signal to determine whether the charging for the terminal 200 while charging is continued.

As an example, the wireless charging equipment 100 performs the authentication process of determining whether the corresponding terminal 200 while charging is the pre-registered terminal through the wireless charging equipment 100 by verifying whether the charging continuation information or the charging stop information is included in the received event report response signal (S850).

As the authentication result, when the charging stop information is included in the received event report response signal, the wireless charging equipment 100 stops (alternatively, ends) the charging for the corresponding terminal 200 by determining that the corresponding terminal 200 is not the pre-registered terminal.

As an example, as the authentication result, when the charging stop information is included in the received event report response signal, the wireless charging equipment 100 stops the charging for the corresponding terminal 200 by determining that the corresponding terminal 200 while charging through the corresponding wireless charging equipment 100 is not the pre-registered terminal (S860).

Further, as the authentication result, when the charging continuation information is included in the received event report response signal, the wireless charging equipment 100 continues the charging for the corresponding terminal 200 by determining that the corresponding terminal 200 is the pre-registered terminal. In this case, the wireless charging equipment 100 transmits a state report request signal including state information of the wireless charging equipment 100 to the service providing device 400 at a predetermined time interval and receives a state report response signal transmitted from the service providing device 400 in response to the transmitted state report request signal.

As an example, as the authentication result, when the charging continuation information is included in the received event report response signal, the wireless charging equipment 100 continues the charging for the corresponding terminal 200 by determining that the corresponding terminal 200 while charging through the corresponding wireless charging equipment 100 is the pre-registered terminal (S870).

Thereafter, when the charging for the terminal 200 stops or the charging for the corresponding terminal 200 is completed, the wireless charging equipment 100 transmits a PRU end request signal to the service providing device 400. Here, the PRU end request signal includes access time information of the corresponding terminal 200 performing the charging function through the wireless charging equipment 100, charging start time information, the identification information of the corresponding terminal 200, the identification information of the corresponding wireless charging equipment 100, and the like.

Further, the service providing device 400 transmits the PRU end response signal to the wireless charging equipment 100 in response to the PRU end request signal transmitted from the wireless charging equipment 100. Here, the PRU end response signal includes the charging end verification information on the corresponding terminal 200, the identification information of the terminal 200, the identification information of the wireless charging equipment 100, and the like.

Further, the wireless charging equipment 100 receives the PRU end response signal transmitted from the service providing device 400 in response to the transmitted PRU end request signal.

As an example, when the charging for the terminal 200 stops or the charging for the corresponding terminal 200 is completed, the wireless charging equipment 100 transmits the PRU end request signal to the service providing device 400 and receives the PRU end response signal transmitted from the service providing device 400 in response to the corresponding PRU end request signal (S880).

The wireless charging equipment, the terminal, and the wireless charging system comprising the same according to the embodiment of the present invention may be prepared with a computer program, and codes and code segments divides configuring the computer program may easily deduced by a computer programmer in the art. Further, the corresponding computer program is stored in the non-transitory computer readable storage medium and read and executed by the computer or the wireless charging equipment, the terminal (alternatively, user equipment) including the PRU, the access point, the service providing device, and the like to implement the wireless charging equipment, the terminal, and the wireless charging system comprising the same.

The non-transitory computer readable storage medium includes a magnetic storage medium, an optical storage medium, and a carrier wave medium. The computer program implementing the wireless charging equipment, the terminal, and the wireless charging system comprising the same according to the embodiment of the present invention may be stored and installed in embedded memories of the wireless charging equipment, the terminal (alternatively, the user equipment) including the PRU, the access point, the service providing device, and the like. Alternatively, external memories of a smart card and the like which store and install the computer program implementing the wireless charging equipment, the terminal, and the wireless charging system comprising the same according to the embodiment of the present invention may be installed in the wireless charging equipment, the terminal (alternatively, the user equipment) including the PRU, the access point, the service providing device, and the like through an interface.

As described above, according to the embodiment of the present invention, it is possible to provide a charging function to only a pre-registered terminal with respect to terminals to use a wireless charging infrastructure by transmitting a charging signal to the terminal corresponding to a communication provider or an affiliated company which is pre-registered in the wireless charging equipment in A4WP scheme wireless charging.

Further, as described above, according to the embodiment of the present invention, it is possible to easily and conveniently perform an authentication function for the terminal without a separate additional component and improve operation efficiency of the entire wireless charging system by determining whether a terminal is a terminal corresponding to a communication provider or an affiliated company which is pre-registered in the wireless charging equipment based on a PRU static parameter and a PRU dynamic parameter including at least one of an IMSI and an IMEI of the terminal which is transmitted from the terminal to the wireless charging equipment, after connecting the terminals including the wireless charging equipment and the PRU.

Further, as described above, according to the embodiment of the present invention, it is possible to enlarge an application range of the wireless charging system by verifying whether to agree to provide personal information to the terminal from the wireless charging equipment as an internet access cost and providing access information for an AP in a store when agreeing with providing the personal information to the terminal, when the terminal attempts to be charged through the wireless charging equipment.

Further, as described above, according to the embodiment of the present invention, it is possible to be utilized as marketing information or a separate recommending service based on collected internet usage information of the terminal by collecting the internet usage information of the terminal transferred through an AP, when the terminal accesses the corresponding AP based on access information for the AP in the store provided to the terminal during charging.

Further, as described above, according to the embodiment of the present invention, it is possible to improve system efficiency of the entire wireless charging system by determining whether the corresponding terminal is charged based on whether a terminal during charging exists through the corresponding wireless charging equipment and whether a user of the corresponding terminal is a pre-registered user in the wireless charging equipment.

Further, as described above, according to the embodiment of the present invention, it is possible to enlarge an application range of the wireless charging system and improved convenience for use by providing additional services to a corresponding terminal based on charging start time information and wireless charging equipment access time information of a terminal which performs a charging function through the corresponding wireless charging equipment transmitted from the wireless charging equipment in a service providing device.

The present invention can be widely used in a wireless charging system field, an advertisement/public relations field, and the like by performing a charging function based on a charge signal in the corresponding terminal by transmitting the charge signal to only the terminal corresponding to a communication carrier or an affiliated store pre-registered in a wireless charger to provide a charging function to only the pre-registered terminal with respect to a terminal to use a wireless charging infrastructure, easily and conveniently perform an authentication function for the terminal without a separate additional component, and improve operation efficiency of the entire wireless charging system.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to the above-described embodiments and the following claims as well as all modified equally or equivalently to the claims are intended to fall within the scope and spirit of the invention.

What is claimed is:

1. Wireless charging equipment comprising:
   a communication unit configured to communicate based on a Bluetooth low energy (BLE) scheme and receive a Power Receiving Unit (PRU) static parameter and a PRU dynamic parameter added with at least one of an international mobile subscriber identity (IMSI), an international mobile equipment identity (IMEI), or affiliated company information, which are transmitted from a connected terminal; and
   a control unit configured to control the communication unit so as to verify the IMSI, the IMEI, and the affiliated company information of the terminal, and further configured to control the communication unit so as to transmit a charging signal generated at a predetermined time interval to the terminal, when at least one of the IMSI, the IMEI, and the affiliated company information included in the received PRU static parameter or PRU dynamic parameter corresponds to pre-registered communication provider information or pre-registered affiliated company information, wherein, when the field number of the IMSI or the IMEI is larger than the field number usable in the PRU static parameter and the PRU dynamic parameter, the IMSI or the IMEI are divided and added to the PRU static parameter and the PRU dynamic parameter, respectively.

2. The wireless charging equipment of claim 1, wherein the IMSI includes a mobile country code, a mobile network code, a mobile subscriber identity, and a country mobile subscriber identifier number, and the IMEI includes a unique serial number of the terminal, a manufacturer of the terminal, and model information.

3. The wireless charging equipment of claim 1, wherein the affiliated company information includes information on an affiliated company subscribed by a user of the terminal.

4. The wireless charging equipment of claim 1, wherein the control unit determines whether the terminal is a pre-registered communication provider or affiliated company capable of receiving the charging signal based on at least one of the IMSI, the IMEI, and the affiliated company information included in the received PRU static parameter or PRU dynamic parameter.

5. The wireless charging equipment of claim 1, wherein the control unit performs a predetermined latch fault process when at least one of the IMSI, the IMEI, and the affiliated company information included in the received PRU static parameter or PRU dynamic parameter does not correspond to pre-registered communication provider information or pre-registered affiliated company information.

6. A terminal comprising:
a communication unit configured to communicate based on a BLE scheme and receive a power beacon signal transmitted from wireless charging equipment; and
a control unit configured to control the communication unit so as to verify an IMSI, an IMEI, and affiliated company information of the terminal including the communication unit, add at least one of the verified IMSI, the IMEI, and the affiliated company information to at least one of a PRU static parameter and a PRU dynamic parameter, and transmit the PRU static parameter or the PRU dynamic parameter added with at least one of the IMSI, the IMEI, and the affiliated company information to the wireless charging equipment,
wherein the communication unit is configured to receive charging signal transmitted from the wireless charging equipment when at least one of the IMSI, the IMEI, and the affiliated company information included in the PRU static parameter or PRU dynamic parameter corresponds to pre-registered communication provider information or pre-registered affiliated company information, and
wherein the control unit is configured to divide the verified IMSI or IMEI when the field number of verified IMSI or IMEI is larger than the field number usable in the PRU static parameter and the PRU dynamic parameter and distribute and add the divided IMSI or IMEI to the PRU static parameter and the PRU dynamic parameter, respectively.

7. The terminal of claim 6, wherein the control unit controls the communication unit so as to transmit a PRU advertisement signal to the wireless charging equipment in response to the power beacon signal transmitted from the wireless charging equipment and communicates with the wireless charging equipment based on the transmitted PRU advertisement signal.

8. The terminal of claim 6, wherein the control unit adds at least one of the verified IMSI, IMEI, and affiliated company information to a Reserved for Future Use (RFU) field in the PRU static parameter or an RFU field in the PRU dynamic parameter.

9. The terminal of claim 6, wherein the control unit controls the battery included in the terminal to be charged based on the charging signal transmitted from the wireless charging equipment, after determining that the terminal is the communication provider or affiliated company pre-registered in the wireless charging equipment based on the transmitted PRU static parameter or PRU dynamic parameter.

10. A wireless charging system comprising:
a terminal configured to provide a PRU static parameter and a PRU dynamic parameter added with at least one of an IMSI, an IMEI, and affiliated company information; and
wireless charging equipment configured to verify the IMSI, the IMEI, and the affiliated company information of the terminal, and further configured to transmit a charging signal generated at a predetermined time interval to the terminal, when at least one of the IMSI, the IMEI, and the affiliated company information included in the received PRU static parameter or PRU dynamic parameter provided from the terminal corresponds to pre-registered communication provider information or pre-registered affiliated company information,
wherein the terminal divides the IMSI or IMEI when the field number of IMSI or IMEI is larger than the field number usable in the PRU static parameter and the PRU dynamic parameter and distributes and adds the divided IMSI or IMEI to the PRU static parameter and the PRU dynamic parameter, respectively.

* * * * *